(12) United States Patent
Trimberger

(10) Patent No.: US 7,219,237 B1
(45) Date of Patent: May 15, 2007

(54) READ- AND WRITE-ACCESS CONTROL CIRCUITS FOR DECRYPTION-KEY MEMORIES ON PROGRAMMABLE LOGIC DEVICES

(75) Inventor: Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 865 days.

(21) Appl. No.: 10/150,192

(22) Filed: May 17, 2002

Related U.S. Application Data

(62) Division of application No. 10/112,790, filed on Mar. 29, 2002.

(51) Int. Cl.
G06F 11/30 (2006.01)
G06F 12/00 (2006.01)

(52) U.S. Cl. ............... 713/193; 711/152; 711/164; 380/277

(58) Field of Classification Search ........... 380/277, 380/44; 713/193, 169; 726/26, 27; 711/152, 711/164
See application file for complete search history.

(56) References Cited

U.S. PATENT DOCUMENTS

| | | | |
|---|---|---|---|
| 3,849,760 A | | 11/1974 | Endou et al. |
| 4,037,214 A | * | 7/1977 | Birney et al. ............. 711/206 |
| 4,757,468 A | * | 7/1988 | Domenik et al. .......... 713/193 |
| 5,084,636 A | | 1/1992 | Yoneda |
| 5,091,938 A | | 2/1992 | Thompson et al. |
| 5,121,359 A | | 6/1992 | Steele |
| RE34,363 E | | 8/1993 | Freeman |
| 5,237,218 A | | 8/1993 | Josephson et al. |
| 5,237,219 A | | 8/1993 | Cliff |
| 5,293,424 A | * | 3/1994 | Holtey et al. ............. 713/193 |
| 5,321,704 A | | 6/1994 | Erickson et al. |
| 5,327,564 A | * | 7/1994 | Little ...................... 713/600 |
| 5,341,034 A | | 8/1994 | Matthews |
| 5,343,406 A | | 8/1994 | Freeman et al. |
| 5,349,249 A | | 9/1994 | Chiang et al. |
| 5,375,169 A | * | 12/1994 | Seheidt et al. ........... 713/171 |
| 5,388,157 A | | 2/1995 | Austin |

(Continued)

FOREIGN PATENT DOCUMENTS

EP  0253530 A2  6/1987

(Continued)

OTHER PUBLICATIONS

Xilinx Application Note, "Configuration Issues: Power-Up, Volatility, Security, Battery Back-Up", By Peter Alfke, XAPP 092, Nov. 24, 1997 (Version 1.1).

(Continued)

Primary Examiner—Nasser Moazzami
Assistant Examiner—Shanto M Z Abedin
(74) Attorney, Agent, or Firm—LeRoy D. Maunu

(57) ABSTRACT

Described are various methods and systems for preventing unauthorized access to decryption keys on programmable logic devices. In one example, a key memory can operate in a secure mode or a non-secure mode. The non-secure mode allows decryption keys to be read or written freely; the secure mode bars read and write access to the decryption keys. The key memory can support secure and non-secure modes on a key-by-key basis.

5 Claims, 14 Drawing Sheets

U.S. PATENT DOCUMENTS

| | | | |
|---|---|---|---|
| 5,394,031 A | 2/1995 | Britton et al. | |
| 5,442,704 A | 8/1995 | Holtey | |
| 5,457,408 A | 10/1995 | Leung | |
| 5,594,793 A * | 1/1997 | Bahout | 713/193 |
| 5,598,424 A | 1/1997 | Erickson et al. | |
| 5,748,740 A | 5/1998 | Curry et al. | |
| 5,768,372 A | 6/1998 | Sung et al. | |
| 5,774,544 A | 6/1998 | Lee et al. | |
| 5,838,901 A * | 11/1998 | Curd et al. | 726/26 |
| 5,914,616 A | 6/1999 | Young et al. | |
| 5,930,826 A | 7/1999 | Lee et al. | |
| 5,933,023 A | 8/1999 | Young | |
| 6,028,445 A | 2/2000 | Lawman | |
| 6,049,222 A | 4/2000 | Lawman | |
| 6,058,477 A * | 5/2000 | Kusakabe et al. | 713/169 |
| 6,118,869 A | 9/2000 | Kelem et al. | |
| 6,172,520 B1 | 1/2001 | Lawman et al. | |
| 6,212,639 B1 | 4/2001 | Erickson et al. | |
| RE37,195 E | 5/2001 | Kean | |
| 6,237,124 B1 | 5/2001 | Plants | |
| 6,259,791 B1 | 7/2001 | Moore | |
| 6,305,005 B1 * | 10/2001 | Burnham | 716/16 |
| 6,324,676 B1 * | 11/2001 | Burnham et al. | 716/16 |
| 6,330,668 B1 | 12/2001 | Curiger et al. | |
| 6,331,784 B1 | 12/2001 | Mason et al. | |
| 6,356,637 B1 * | 3/2002 | Garnett | 380/265 |
| 6,366,117 B1 * | 4/2002 | Pang et al. | 326/38 |
| 6,441,641 B1 | 8/2002 | Pang et al. | |
| 6,442,092 B1 | 8/2002 | Tomita | |
| 6,473,861 B1 | 10/2002 | Stokes | |
| 6,477,677 B1 | 11/2002 | Abiven et al. | |
| 6,598,161 B1 | 7/2003 | Kluttz et al. | |
| 6,636,971 B1 * | 10/2003 | Loukianov | 713/189 |
| 6,662,333 B1 | 12/2003 | Zhang et al. | |
| 6,785,816 B1 | 8/2004 | Kivimaki et al. | |
| 6,823,069 B1 | 11/2004 | Kitajima et al. | |
| 6,883,075 B2 | 4/2005 | Lin et al. | |
| 6,904,527 B1 | 6/2005 | Parlour et al. | |
| 6,931,128 B2 | 8/2005 | Roberts | |
| 6,931,543 B1 * | 8/2005 | Pang et al. | 713/193 |
| 6,948,026 B2 | 9/2005 | Keays | |
| 6,957,340 B1 * | 10/2005 | Pang et al. | 713/189 |
| 2001/0015919 A1 * | 8/2001 | Kean | 365/200 |
| 2001/0032318 A1 | 10/2001 | Yip et al. | |
| 2001/0037458 A1 | 11/2001 | Kean | |
| 2002/0018561 A1 | 2/2002 | Emelko | |
| 2002/0059518 A1 * | 5/2002 | Smeets et al. | 713/166 |
| 2002/0064282 A1 * | 5/2002 | Loukianov et al. | 380/277 |
| 2002/0069257 A1 | 6/2002 | Rigori et al. | |
| 2003/0091185 A1 * | 5/2003 | Swindlehurst et al. | 380/44 |

FOREIGN PATENT DOCUMENTS

| | | |
|---|---|---|
| WO | WO92/20157 | 11/1992 |
| WO | WO94/10754 | 11/1993 |
| WO | WO94/01867 | 1/1994 |

OTHER PUBLICATIONS

Virtex Configuration Guide, published by Xilinx, Inc., 2100 Logic Drive, San Jose, CA 95124, Oct. 9, 2000 (Version 1.0).

Bruce Schneier "Applied Cryptography: Protocols, Algorithms, and Source Code in C", Second Edition, Copyright 1996, published by John Wiley & Sons, Inc.; Chapter 9, pp. 193-194, Chapter 10, 200-203 and p. 216; Chapter 12, pp. 265-301, Chapter 15, pp. 360-361, p. 456 and 483-502.

Cahners EDN Access Web Page, "Cunning circuits confound crooks," Oct. 12, 2000; pp. 1-8; http://www.ednmag.com/ednmag/reg/2000/10122000/21df2.htm.

Xilinx, Application Note, XAPP138, "Virtex FPGA Series Configuration and Readback", published Oct. 4, 2000, available from Xilinx, Inc., 2100 Logic Drive, San Jose, California 95124.

Wolfgang Hoflich, Applications Note, "Using the XC4000 Readback Capability", XAPP 015.000, 1993, available from Xilinx, Inc., 2100 Logic Drive, San Jose, CA 95124, pp. 8-37 to 8-44.

Ann Duncan, Application Note, "DES Encryption and Decryption on the XC6216", available from Xilinx, Inc., 2100 Logic Drive, San Jose, CA 95124, XAPP 106, Feb. 2, 1998 (version 1.0), pp. 1-7.

"XC9500 In-System Programmable CPLD Family", available from Xilinx, Inc., 2100 Logic Drive, San Jose, CA 95124, Sep. 15, 1999 (version 5.0), pp. 1-16.

Product Specification, "XC18V00 Series of In-System Programmable Configuration PROMs", available from Xilinx, Inc., 2100 Logic Drive, San Jose, CA 95124, Nov. 12, 2001, DS026, (version 3.0), pp. 1-19.

Advanced Product Specification, "XC9500XV Family High-Performance CPLD", available from Xilinx, Inc., 2100 Logic Drive, San Jose, CA 95124, Jan. 15, 2001, DS049, (version 2.0), pp. 1-18.

"The Programmable Logic Data Book", published 1998, pp. 4-46 through 4-59, available from Xilinx, Inc. 2100 Logic Drive, San Jose, CA 95124.

"The Programmable Logic Data Book", published 1994, pp. 2-105, through 2-132, 2-231 through 2-235, available from Xilinx, Inc. 2100 Logic Drive, San Jose, CA 95124.

Menezes, A. J., et al., Handbook of Applied Cryptography, 1996, CRC Press, pp. 338-363.

Altera Corporation; Altera.com; "The Advantages of Hard Subsystems in Embedded Processor PLDs" (Mar. 4, 2002) Altera Whitepaper available at http://www.altera.com/corporate/news_room/releases/releases_archive/2002/products/nr-emb_wp.html.

Johnson, Mark G.; "Encryption Code (three different sources)" Jan. 18, 1991. usenet:sci.crypt. Relevant code on p. 20 of printout.

Cristiano, Paris; "Burn! Burn it all!" Oct. 7, 1996. usenet: sci.crypt.

Dipert, Brian; "Cunning Circuits Confound Crooks," Oct. 12, 2000. Cahners EDN Access.

Hamalainen et al.; "Configurable Hardware Implementation of Triple-DES Encryption Algorithm For Wireless Local Area Network", May 2001; IEEE Proceedings, (ICASSP '01) vol. 2, May 7-11, 2001, pp. 1221-1224, vol. 2.

Schneier, Bruce; "Applied Cyptography" 1996. John Wiley & Sons pp. 283-284, 360.

National Institute of Standards and Technology "Announcing Draft Federal Information Processing Standard (FIPS) 46-3, Data Encryption Standar (DES), and Request for Comments", Jan. 15, 1999.

Rubin, Paul et al., "What Do You Do With Boken Crypto Hardware?" Jan. 25, 2001, pp. 1-4. usenet:sci.crypt.

Altera, Inc., "Altera Publishes White Paper on Hard Subsystems in Embedded Processor PLDs", Mar. 4, 2002, Http://www.altera.com/corporate/news_room/releases_archive/2002/products/nr-emb_wp.html.

Menezes, A. J., et al., Handbook of Applied Cryptography, 1996, CRC Press, pp. 578-581.

* cited by examiner

| | |
|---|---|
| Header A | |
| Data A | |
| Header B | |
| Data 1B | |
| Data 2B | |
| Data 3B | |
| Data 4B | |
| Header C | |
| Data 1C | |
| ⋮ | |

Fig. 2a
PRIOR ART

| Bitstream header Config. Logic Reg. address | Config. Logic Register data contents |
|---|---|
| 0 0 0 0 | Cyclic Redundancy Check (CRC) |
| 0 0 0 1 | Frame Address |
| 0 0 1 0 | Frame Data Input |
| 0 0 1 1 | Frame Data Output |
| 0 1 0 0 | Command |
| 0 1 1 0 | Control |
| 0 1 1 1 | Status |
| 1 0 0 0 | Daisy Chain Output |
| 1 0 0 1 | Configuration Option |
| 1 0 1 0 | Reserved |
| 1 0 1 1 | Frame Length |
| 1 1 0 0 | Reserved |
| 1 1 0 1 | Reserved |
| 1 1 1 0 | Reserved |
| 1 1 1 1 | Reserved |

Fig. 2d
PRIOR ART 32-bit Command Header Format 1

| Format Type | Op code | Config. Logic Register address | Word count |
|---|---|---|---|
| 0 0 1 | 0 0 1 1 0 | | |

11 bits, counts 2048 words

Fig. 2b PRIOR ART 32-bit Command Header Format 1

| Format Type | Op code | Config. Logic Register Address | Word Count |
|---|---|---|---|
| 0 0 1 | 0 0 1 1 0 | | 0 0 0 0 0 0 0 0 0 0 0 |

32-bit Command Header Format 2

| Format Type | Op code | Word Count |
|---|---|---|
| 0 1 0 | 0 0 1 1 0 | |

27 bits, counts 2.68 million words or 10 megabytes

Fig. 2c PRIOR ART

READ- AND WRITE-ACCESS CONTROL CIRCUITS FOR DECRYPTION-KEY MEMORIES ON PROGRAMMABLE LOGIC DEVICES

BACKGROUND

A PLD (programmable logic device) is an integrated circuit that performs digital logic functions selected by a designer. PLDs include logic blocks and interconnect lines, and typically both the logic blocks and interconnect lines are programmable. One common type of PLD is an FPGA (field programmable gate array), in which the logic blocks typically include lookup tables and flip-flops that generate and store any logic function of their input signals. Another type of PLD is the CPLD (complex programmable logic device), in which the logic blocks perform the AND function and the OR function and the selection of input signals is programmable.

Designs implemented in PLDs have become so complex that it often takes months to complete and debug a design to be implemented in a PLD. When the design is going into a system of which the PLD is a part and is to be sold for profit, the designer does not want the result of this design effort to be copied by someone else. The designer often wants to keep the design a trade secret.

Many PLDs, particularly FPGAs, use volatile configuration memory that must be loaded from an external device such as a PROM every time the PLD is powered up. Since configuration data is stored external to the PLD and must be transmitted through a configuration access port, the privacy of the design can easily be violated by an attacker who monitors the data on the configuration access port, e.g. by putting probes on board traces.

Efforts have been made to encrypt designs, but it is difficult to make the design both secure from attackers and easy to use by legitimate users. Finding an appropriate encryption algorithm is not a problem. Several encryption algorithms, for example, the Data Encryption Standard (DES) and the more secure Advanced Encryption Standard (AES) algorithms are known for encrypting blocks of data. Cipher block chaining (CBC), in which each block of data is XORed with the immediately previous block and then encrypted, allows the DES or AES to encrypt a serial stream of data and these are therefore appropriate for encrypting a bitstream for configuring a PLD. A key used for encrypting the design must somehow be communicated in a secure way between the PLD and the structure that decrypts the design, so the design can be decrypted by the PLD before being used to configure the PLD. Then, once the PLD has been configured using the unencrypted design, the design must continue to be protected from unauthorized discovery. And, to make matters still more difficult, a single PLD configuration may include "cores," or subdesigns, from several vendors, and each vendor may use a different key to protect his or her core.

A Nov. 24, 1997, publication by Peter Alfke of Xilinx, Inc., entitled "Configuration Issues: Power-up, Volatility, Security, Battery Back-up" describes several steps that can be taken to protect a design in an existing FPGA device having no particular architectural features within the FPGA to protect the design. Loading design configuration data into the FPGA and then removing the source of the configuration data but using a battery to maintain continuous power to the FPGA while holding the FPGA in a standby non-operational mode is one method. However, power and system cost requirements make this method impractical for many applications.

Nonvolatile configuration memory is another possibility. If the design is loaded at the factory before the device is sold, it is difficult for a purchaser of the configured PLD device to determine what the design is. It is possible, however, to discover the program states of non-volatile memories, and consequently to reverse-engineer proprietary PLD designs. Some memory technologies, such as antifuses, are vulnerable to inspection under a microscope. Memory technologies that rely on stored charge can be attacked by chemically treating memory cells to determine their charge states after removing overlaying metal layers. Also disadvantageous, nonvolatile memory fabrication requires a more complex and more expensive process technology than standard CMOS process technology, and takes longer to bring to market.

It is also known to store a decryption key in nonvolatile memory in a PLD, load an encrypted bitstream into the PLD and decrypt the bitstream using the stored key. This prevents an attacker from reading the bitstream as it is being loaded into the PLD, and does retain the key when power is removed from the PLD. Such arrangements are described by Austin in U.S. Pat. No. 5,388,157 and by Trimberger in U.S. patent application Ser. No. 09/253,401 entitled "Method and Apparatus for Protecting Proprietary Configuration Data for Programmable Logic Devices," both of which are incorporated herein by reference. However, these arrangements do not protect user's designs from all modes of attack.

There is a need for additional design protection methods that are convenient, reliable, and secure.

SUMMARY

The present invention is directed to methods and structures for configuring PLDs using encrypted configuration data. PLDs in accordance with the invention are adapted to include a decryptor and one or more non-volatile memory elements, each programmed with a secret decryption key. Encrypted configuration data representing some desired circuit function is presented to the decryptor. The decryptor then decrypts the configuration data, using a secret decryption key, and configures the FPGA with the decrypted configuration data.

Some PLDs offer the option of partial configuration (where several configuration addresses are specified for loading several portions of a design) and partial reconfiguration (where an existing design is not erased before new design data are loaded). If the PLD offers these options, an attacker could partially reconfigure a PLD with his or her own bitstream in a "Trojan Horse" attack to make successive portions of the design visible, and possibly learn the whole design. To avoid such an attack, each entity responsible for contributing a subdesign for a PLD configuration includes a shared password with the bitstream specifying their subdesign. The shared password is then encrypted along with the rest of the configuration data. The PLD will not function with any design not including the shared password to authenticate the design. The shared password can be stored in non-volatile memory prior to configuration, or the first core loaded into the PLD can be adapted to store the shared password in volatile or non-volatile memory.

In another embodiment, a non-volatile memory in the PLD stores a message-authentication code (MAC) for each subdesign (core) to be loaded into the PLD. The MAC might be, for example, a hash function of a bitstream defining a subdesign. The hash function of each subdesign bitstream can then be compared with the appropriated MAC to authenticate the subdesign. The PLD will not function with any design (e.g., a Trojan Horse) that does not produce the appropriate MAC.

PLD configuration memory is typically divided into "frames." One embodiment of the invention reduces the risks associated with Trojan Horse attacks by preventing the overwriting of frames between device resets.

One programmable logic system in accordance with the invention provides improved key security and simplifies the process of upgrading PLDs in the field using proprietary configuration data. A PLD is connected to an external memory that stores one or more decryption keys to be loaded onto the PLD. The system also includes some key-write control circuitry that transfers one or more of the decryption keys from the external memory to the PLD. The key-write control circuitry then clears any keys transferred to the PLD so the keys are no longer accessible from outside the PLD.

Encrypted configuration data cannot be read without the correct key, so it is important to verify the integrity of decryption keys stored in a programmable logic device. However, it is equally important to maintain the secrecy of the keys during key verification. A system in accordance with the invention addresses this issue by allowing users to verify the validity of decryption keys without allowing users access to the keys. A one-way function, such as a cyclic redundancy check (CRC), is performed by the author of the decryption key, and the resulting value is distributed to a user authorized to verify key validity. To verify the key, the user loads the CRC value into a register in the PLD, where the CRC value is compared with a second CRC value generated by an on-chip CRC generator connected to the key memory. The key is deemed valid if the CRC values match.

Another embodiment enables users to verify keys while maintaining secrecy by providing read- and write-protect fields associated with each key field on a PLD. A user can write to any key field not write-protected, and can read from any key field not read-protected. A user can thus write and verify keys, so long as the read- and write-protect fields are not set. Once satisfied, the user can set the read-protect field to prevent future reads.

Setting the read-protect field bars any future read access to the stored key, but does not bar future use of the key field in which the key is stored. For example, the user may overwrite the stored key with the same or a different key. This possibility leaves the PLD exposed to potential "Trojan Horse" attacks. The user therefore has the option of setting the write-protect field for one or more key fields to disallow writing any additional keys.

Another embodiment addresses the possibility of key errors using error correction. In this embodiment, a PLD includes, for each decryption-key field in key memory, an associated correction-code (ECC) field. The PLD additionally includes error-correction circuitry that receives each key and associated ECC and performs an error correction before conveying the resulting error-corrected key to a decryptor. The error correction circuitry can perform, for example, the well-known Hamming error-correction technique.

Another embodiment employs a PLD with a number of internal, "hard-wired" (e.g., mask programmed) decryption keys. In this embodiment, only the manufacturer knows the encryption/decryption keys. Users can nevertheless employ the keys to encrypt configuration data by specifying one of the keys in software. The user may, for example, specify a decryption key embedded in software stored in a conventional computer on e.g. a hard disk or some other form of computer-readable medium. In this embodiment, the keys are never transmitted, so they cannot be probed; instead, only the address of the specified decryption key is conveyed between the computer and the PLD.

Another embodiment further protects decryption keys by encrypting the keys themselves before transferring them to a key memory in the target PLD, thus ensuring the keys will not be compromised in transit. One such embodiment encrypts a decryption key for decrypting configuration data (the "configuration key") using a Public-Key Encryption algorithm (e.g., RSA). The configuration key is encrypted using a public key prior to transfer to the PLD. Once in the PLD, the configuration key is decrypted using a private key previously stored on the PLD. The decryptor used to decrypt the configuration key can be instantiated on the PLD using programmable resources.

Another embodiment includes a PLD in which the key memory can be operated in a secure mode or a non-secure mode. The non-secure mode allows the decryption keys to be read or written freely; the secure mode bars read and write access to the decryption keys. The PLD supports secure and non-secure modes on a key-by-key basis. Users may therefore write, verify, and erase individual keys without affecting others.

This summary does not define the scope of the invention, which is instead defined by the appended claims.

BRIEF DESCRIPTION OF THE FIGURES

FIGS. 2a, 2b, 2c, and 2d show bitstream format and commands that can be included in a prior art bitstream.

DETAILED DESCRIPTION

Figure 1:
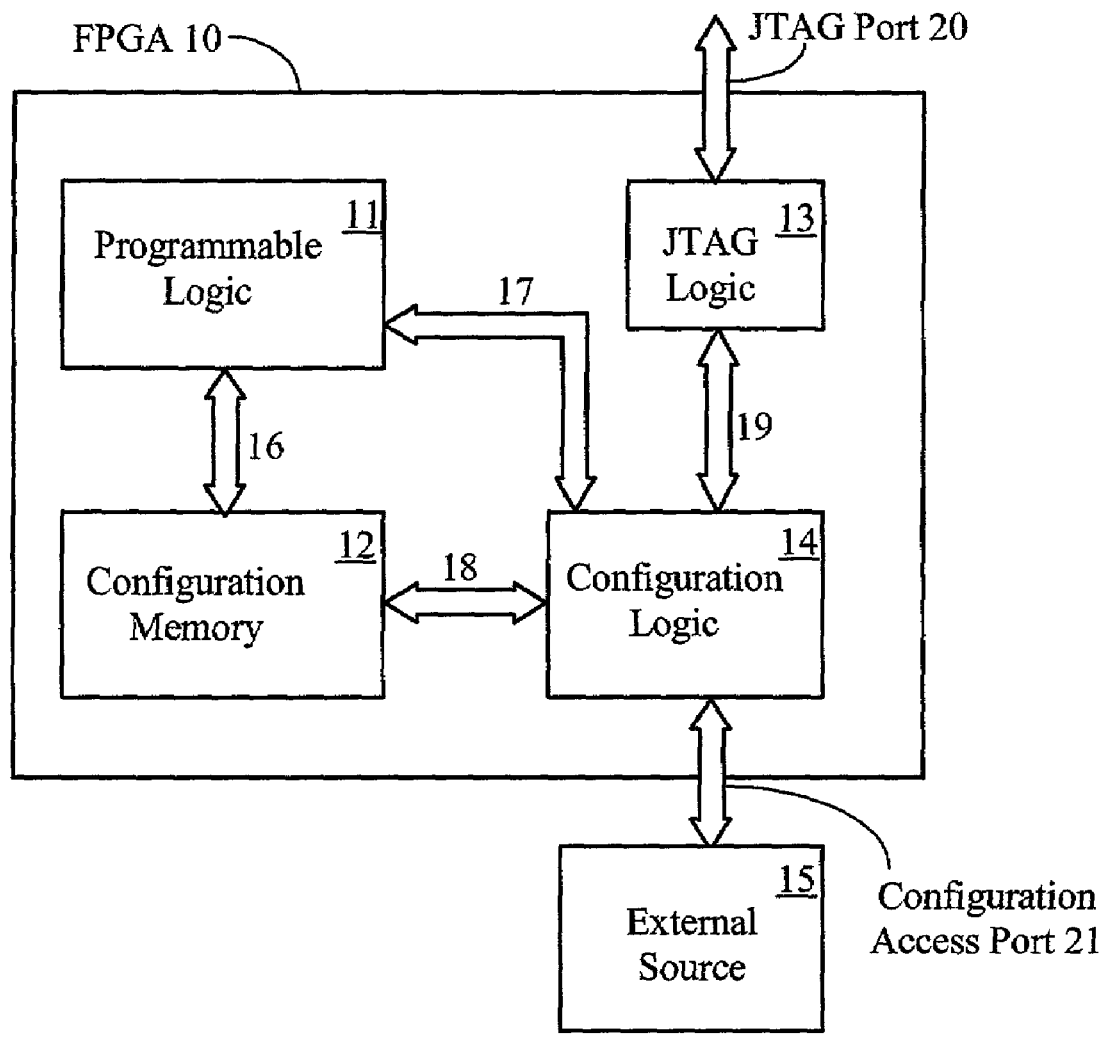
FIG. 1 shows a prior art structure for an FPGA 10.

FIG. 1 shows a prior art structure for an FPGA 10. The FPGA includes programmable logic 11, typically comprising (1) logic blocks with lookup-table combinational logic function generators, flip-flops for storing lookup table outputs and other values, and multiplexers and logic gates for enhancing the logic ability of the programmable logic (2) routing lines and programmable interconnection points for routing signals around the FPGA, and (3) input/output blocks for driving signals between the routing lines and the external pins of the FPGA. The above-listed elements are not shown here, but are described by Young in U.S. Pat. No. 5,933,023, entitled "FPGA Architecture Having RAM Blocks with Programmable Word Length and Width and Dedicated Address and Data Lines", which is incorporated herein by reference.

The FPGA also includes configuration memory 12 for turning on routing transistors, controlling multiplexers, storing lookup tables, and controlling the input/output blocks, all of this for the purpose of configuring the FPGA to perform the function desired by the designer(s). Bus 16 connects configuration memory 12 to programmable logic 11 and is typically a distributed set of control lines located throughout the FPGA. Some Xilinx products (e.g. XC6200) include a bus 17 by which programmable logic 11 causes configuration logic 14 to send programming information to configuration memory 12. Such a structure is described by Kean in U.S. Reissue Patent RE37,195 E, entitled "Programmable Switch for FPGA Input/Output Signals", which is incorporated herein by reference.

FPGA 10 further includes a JTAG logic block 13 for interfacing with JTAG port 20, especially intended for testing of the board in which the FPGA will be placed. JTAG logic block 13 implements the IEEE standard 1532, which is a superset of the IEEE standard 1149.1. JTAG conventionally allows debugging of a design at the board level.

Finally, FPGA 10 includes configuration logic 14 for responding to a configuration bitstream from external source 15 on configuration access port 21 and for interfacing with JTAG logic block 13. The bitstream on configuration access port 21 is treated as words, in one embodiment 32-bit words. Several of the words, usually at or near the beginning of the bitstream, are used for setting up the configuration process and include, for example, length of a configuration memory frame and a starting address for the configuration data. Bus 19 allows communication between configuration logic 14 and JTAG logic block 13 so that the JTAG port 20 can be used as another configuration access port. Bus 18 allows communication between configuration logic block 14 and configuration memory 12. In particular, bus 18 carries addresses to select configuration frames in memory 12, control signals to perform write and read operations, and data for loading into configuration memory 12 or reading back from configuration memory 12.

Configuration Logic block 14 receives instructions and data, and processes the data according to the instructions. These instructions and data come into configuration logic 14 as a bitstream. An instruction, or header, is usually followed by data to be acted upon. FIG. 2a shows an example of a conventional bitstream structure. Header A specifies an action and specifies that a single word, DataA, will follow. Header B specifies an action and in this case specifies that 4 words of data will follow to be acted upon.

FIG. 2b shows the default format (format type 001) for a 32-bit header word in the bitstream used in the Virtex® devices available from Xilinx, Inc. (Virtex is a registered trademark of Xilinx, Inc., assignee of the present invention). This format includes three bits to indicate the format type (001), two bits to specify an op code, 16 bits for a configuration-logic register address, and 11 bits for a word count. The op code can designate a read operation, a write operation, or no operation. For example, 00 can designate no operation, 01 can designate read and 10 can designate write. The 11 bits for word count can specify 211 words or 2048 words. As shown in FIG. 2c, if the word count is greater than this, the word count bits in format type 001 are set to 00000000000 and the header of format type 001 is followed by a header of format type 2. Format type 2 uses 27 bits to specify word count, and can thus specify 227 words or 2.68 million words.

FIG. 2d shows the kinds of control information that can be loaded into the registers of Configuration Logic 14 by headers for a Virtex bitstream. For example, a header (of format 001) having the configuration logic register address 0000 specifies that the next 32-bit data word should be loaded into the cyclic redundancy check (CRC) register. (Virtex devices use a 16-bit cyclic redundancy check value so some bits will be padded with 0's.) If the header includes an address 0001, the next data will be loaded into the Frame Address register in order to specify a frame (column) in configuration memory 12 to receive or provide data.

The Configuration Logic Register address (16 bits) shown in FIG. 2b provides the 4-bit values shown in the left column of FIG. 2d that select one of the registers in configuration logic 14 (FIG. 1) into which to place the next 32-bit data word. The Frame Length register (address 1011) specifies the length of the frame into which the configuration data will be loaded. (Frame length, or column height, depends upon the size of the PLD. Larger PLDs usually have taller columns or longer frames. Specifying the frame length in the bitstream and storing the frame length in a register rather than providing a different structure in the PLD for placing the data words into frames allows the internal configuration logic to be identical for PLDs of different sizes.)

For readback, a read command is placed in the op code field and the Frame Data Output register is addressed, followed by a Word Count (using Command Header Format 2 if necessary). The specified number of words is read back from configuration memory 12, starting at the address specified in the Frame Address register, and shifted out on either configuration access port 21 or JTAG port 20. (Readback data is returned to the port that issued the readback instruction).

Specifying a word count in a bitstream header or pair of headers (FIGS. 2b and 2c) sets a counter that counts down as the data words are loaded. For many configuration logic register addresses the word count is 1. But if the bitstream header has a configuration logic address of 0010 or 0011 to indicate configuration data are being loaded in or read back, the word count will be much larger. This is when header format 2 of FIG. 2c is used. Data loaded into configuration memory 12 through the frame data input register (address 0010) or read out through the frame data output register (address 0011) is called the design data because it causes the FPGA to implement a design or shows the status of a design. The other register data are control data since they control how the configuration logic behaves while the logic is being configured or read back. Further detail about configuration of Virtex devices can be found in the "Virtex Configuration Guide" published Oct. 9, 2000, by Xilinx, Inc. (assignee of the present invention), 2100 Logic Drive, San Jose, Calif. 95124. This configuration guide is incorporated herein by reference.

Configuration logic 14 typically performs a cyclic redundancy check (CRC) on a configuration bitstream coming in (see Erickson, U.S. Pat. No. 5,321,704 incorporated herein by reference, or see pages 39 through 40 of the above-referenced Virtex Configuration Guide), reads header bits indicating the frame length of the part being configured and the word count of the configuration data, reads address instructions identifying where to load configuration data, collects frames of configuration data and loads them into columns of configuration memory 12 indicated in the addresses. Configuration logic 14 also controls readback of configuration data and flip-flop values from configuration memory 12 to an external location. In a Virtex FPGA available from Xilinx, Inc., readback can be done through either JTAG port 20 or through configuration access port 21. Because the act of reading back the bitstream would expose the unencrypted bitstream to view, readback is disabled for configurations that employ decryption keys.

Configuration logic 14 can also receive configuration data from programmable logic 11. More information about prior art FPGA structures in which part of the FPGA configures another part of the FPGA can be found in Kean, U.S. Reissue Patent RE37,195 E. More information about architectures of FPGAs similar to the Virtex A architecture can be found in Young et al., U.S. Pat. No. 5,914,616. Both patents are incorporated herein by reference. The format of a bitstream used with the Virtex product available from Xilinx, Inc., assignee of the present invention, is described in an Application Note, XAPP138, entitled "Virtex FPGA Series Configuration and Readback" available from Xilinx, Inc., 2100 Logic Drive, San Jose, Calif. 95124 published Oct. 4, 2000, which is also incorporated herein by reference.

Figure 3:
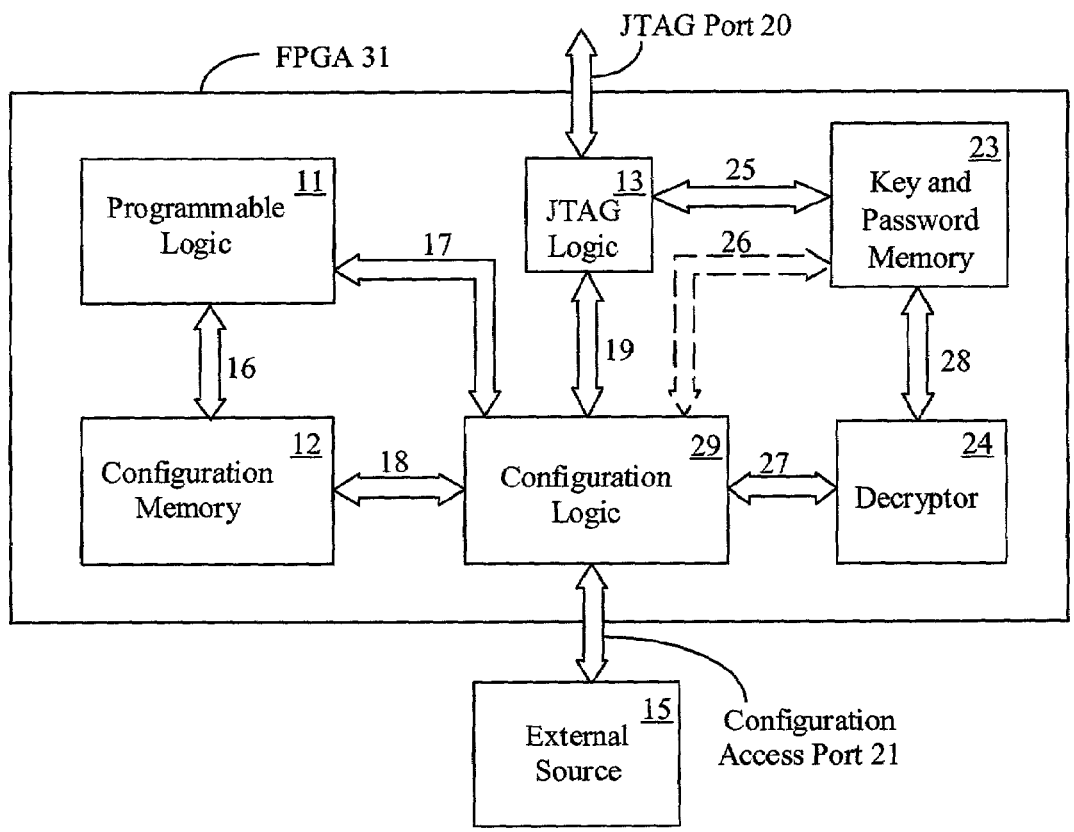
FIG. 3 shows a block diagram of an FPGA 31 in accordance with one embodiment of the invention.

FIG. 3 shows a block diagram of an FPGA 31 in accordance with one embodiment of the invention. Some elements are the same as shown in FIG. 1, are given the same reference numbers, and not explained again. In addition, FIG. 3 includes an expanded configuration logic unit 29, a decryptor 24, and a key memory 23. FIG. 3 shows an embodiment in which memory 23 is loaded with encryption keys and a configuration password via bus 25 from JTAG access port 20. In other embodiments, key memory 23 is loaded through another port.

Bus 25 carries data, addresses, and control signals to perform write and read operations and allows programming of the decryption keys and configuration passwords from JTAG port 20. An optional bus 26 between configuration logic and memory 23 allows programming of keys and passwords via configuration access port 21. Bus 26 may also carry security data from memory 23 to configuration logic 29. In one embodiment, bus 27 carries encrypted configuration data from configuration logic 29 to decryptor 24 and carries decrypted configuration data back to configuration logic 29. Bus 28 allows decryptor 24 to access the keys for decrypting data. When the structure of FIG. 3 is being loaded with encrypted data, an attacker who monitors the bitstream as it is being loaded receives only the encrypted bitstream.

In some embodiments, the bitstream for a design or a subdesign comprises two portions, a data portion representing the user's design that can be encrypted or not, and a control portion controlling loading of the bitstream (for example giving addresses of columns in the PLD into which successive portions of the bitstream are to be loaded, providing a CRC code for checking reliability of the loading operation, and a starter number for cipher block chaining (CBC), a technique that prevents a "dictionary attack" where the decrypted data can be deduced from the frequency of occurrence of the encrypted data). Such embodiments are detailed in U.S. patent application Ser. No. 09/724,652, entitled "PROGRAMMABLE LOGIC DEVICE WITH DECRYPTION ALGORITHM AND DECRYPTION KEY," by Pang et al. In other embodiments, used when the order of addresses in which configuration data is loaded may be useful to an attacker in analyzing the design, the address of the configuration data is also encrypted, but other control information in the configuration bitstream remains unencrypted. This too is detailed in the above-referenced Pang et al. application.

As noted above in the background section, sometimes a single FPGA configuration includes a number of subdesigns, or cores, designed by different entities. For example, a circuit designer may employ an FPGA to create a circuit that includes a standard interface (e.g., the popular PCI interface) and some glue logic specific to the designer's needs. In such a case, the designer might opt to purchase a design for the standard interface from a core vendor to save valuable time. Both the core vendor and the designer, fearing copyists, may want to separately encrypt the data defining their respective designs. One embodiment of the invention thus affords each of several entities responsible for portions of a single PLD design the ability to separately protect their portion of the design. Some FPGAs allow partial reconfiguration of the FPGA or allow different parts of a design to be loaded into different parts of the FPGA using separate starting addresses and separate write instructions. An attacker might attempt to learn the design by partially reconfiguring the FPGA to read contents of a block RAM or flip-flops directly to output ports or by adding a section to an existing design to read out information that can be used to learn the design. For example, the attacker might partially reconfigure the FPGA with an unencrypted design whose only purpose is to extract information about the encrypted design. Such a "Trojan Horse" design could be loaded into the PLD with another bitstream or attached to an existing encrypted bitstream. If the attacker was interested in learning a state machine design loaded into block RAM of an FPGA, for example, the Trojan Horse design could include logic to cycle through the addresses of the block RAM and send the block RAM data contents to device pins for observations. Various embodiments of the invention prevent attackers from gaining access to decrypted configuration data using "Trojan Horse" attacks. (For additional methods and circuits for protecting against Trojan Horse attacks, see co-pending application Ser. No. 10/112,838, filed Mar. 29, 2002 and entitled "Method and Apparatus for Protecting Proprietary Configuration Data for Programmable Logic Devices," by Stephen M. Trimberger, which is incorporated herein by references.)

Figure 4:
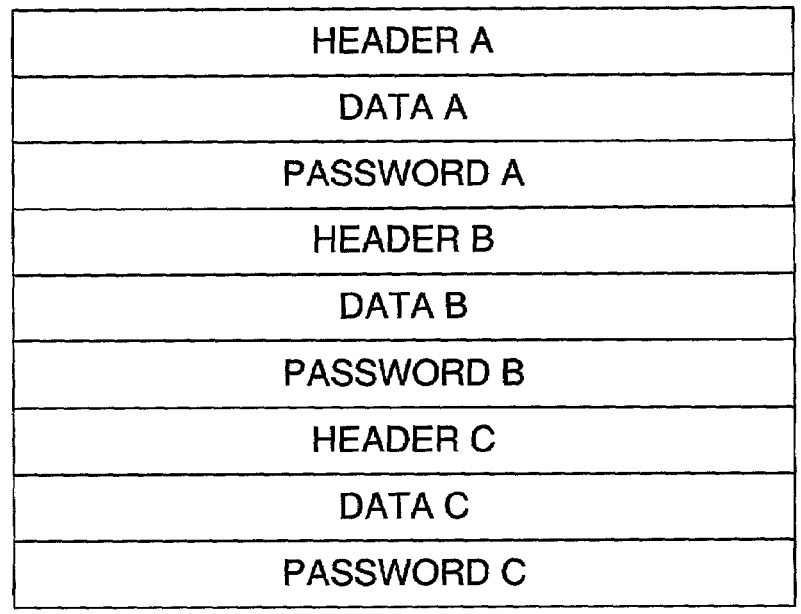
FIG. 4 illustrates a bitstream format and registers of configuration logic 29 similar to the format described in connection with FIGS. 2a–2d.

FIG. 4 illustrates a bitstream format and registers of configuration logic 29 similar to the format described in connection with FIGS. 2a–2d. The bitstream format of FIG. 4 differs from that of FIGS. 2a–2d, however, in that the portion of the configuration bitstream associated with each subdesign includes a shared password to authenticate the subdesign. Trojan-Horse configurations lacking the shared password are rejected or render the FPGA inoperable.

The bitstream of FIG. 4 includes three header words header A, header B, and header C, each of which is followed by respective configuration data and a password common to all headers. In the example, each header represents a write command that introduces one subdesign of an overall configuration for an FPGA. The subdesigns are typically combined and conveyed to the FPGA as a signal bitstream. As noted above, each subdesign might come from a different entity, and may be encrypted using different keys. In accordance with the depicted embodiment, each portion of the bitstream associated with a subdesign includes a respective encrypted version of a shared password. Unauthorized designs, such as the as the feared "Trojan Horse," presumably lack the password, and consequently will be unable to occupy the same FPGA as the other designs.

Figure 5:
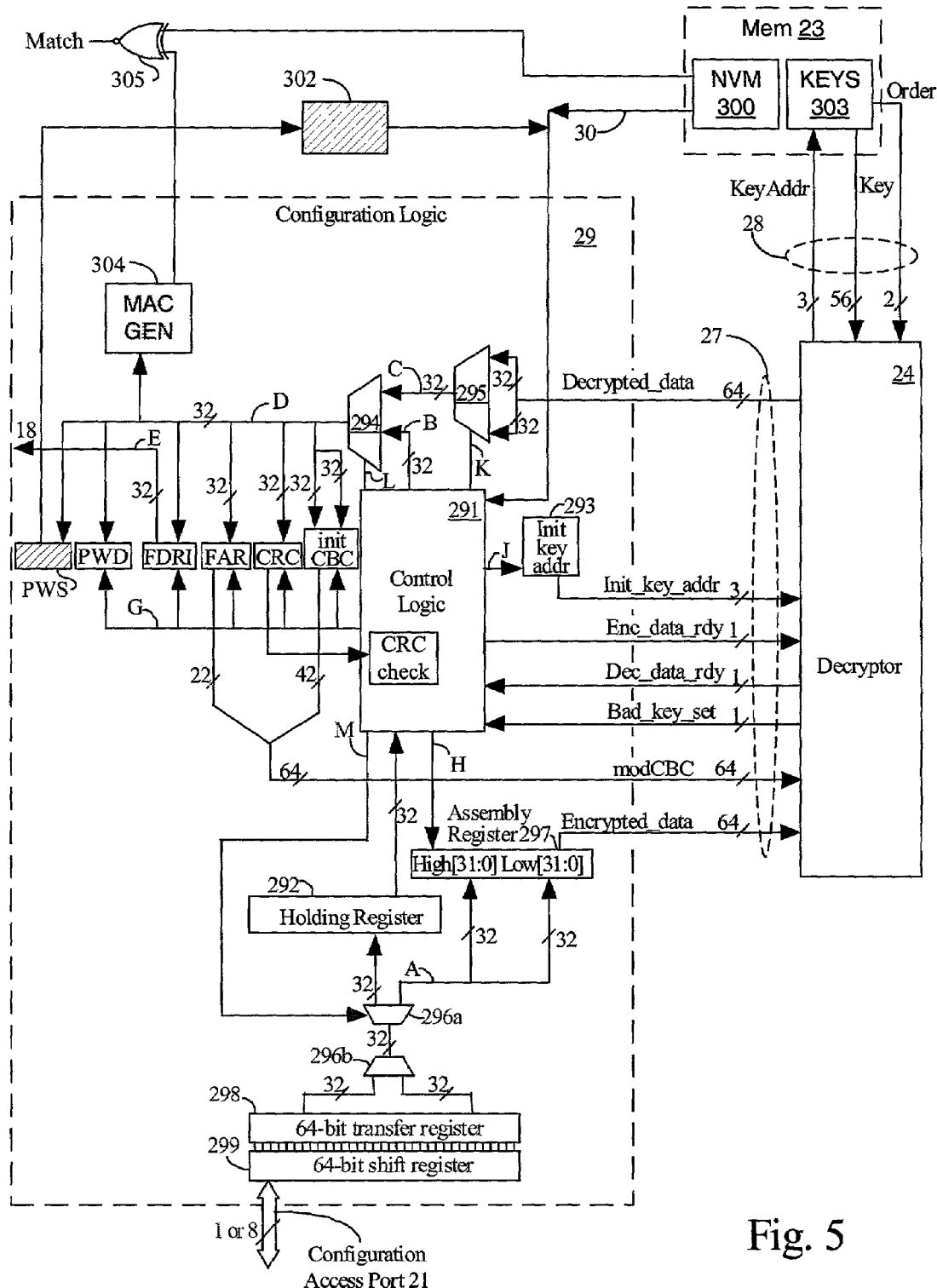
FIG. 5 illustrates a portion of FPGA 31 of FIG. 3, and is used in connection with the following discussion to illustrate a number of embodiments of the invention.

FIG. 5 illustrates a portion of FPGA 31 of FIG. 3, and is used in connection with the following discussion to illustrate a number of embodiments of the invention. Common to all embodiments, FIG. 5 shows the detail of configuration logic 29 and of buses 27 and 28 leading into decryptor 24. Bus 27 connects to input and output ports of decryptor 24, and is described in more detail in the above-incorporated Pang et al. application.

Bus 28 connects to input and output ports of decryptor 24, and includes the following:
1. 3 lines for the key address, which is initially the key address provided from bus 27, but which is updated each time a new key is used,
2. 56 lines for the decryption key, and
3. 2 lines for indicating whether the decryption key is the first, middle, last, or only key to be used.

An additional bus 30 conveys the password stored in memory 23 to control logic 291 within configuration logic 29.

One potential attack on a design in an encrypted bitstream is to change the frame address register (starting address) in the encrypted bitstream so that when it is decrypted it is loaded into a portion of the FPGA visible when the FPGA is being used. In some designs the content of the block RAM is visible. In all designs the configuration of the input/output ports is visible and therefore the configuration bits can be determined. Thus if successive portions of the design were moved to visible portions of the FPGA, even though the FPGA did not function properly, an attacker could in repeated relocation learn the contents of the unencrypted bitstream.

Configuration logic 29 includes the structures to support optional encryption, to prevent design relocation, and to prevent the incorporation of Trojan-Horse designs. As shown in FIG. 5, configuration logic 29 includes a holding register 292, control logic 291, configuration registers (FDRI, FAR, CRC, and init CBC are shown), decryptor 24 interface multiplexers 294 and 295, 64-bit assembly register 297, and registers 298 and 299 (for interfacing with configuration access port 21). In accordance with one embodiment of the invention, configuration logic 29 additionally includes a password register PWD that sequentially stores, for comparison to a reference password, each decrypted password received with the configuration bitstream.

A 64-bit shift register 299 receives data from configuration access port 21, which can be a single pin for 1-bit wide data or 8 pins for 8-bit wide data. This data is loaded into 64-bit shift register 299 until register 299 is full. Then these 64 bits are preferably shifted in parallel into 64-bit transfer register 298. From there, multiplexer 296b alternately selects right and left 32-bit words, and multiplexer 296a moves the data 32 bits at a time either into holding register 292 or alternately into High and Low portions of assembly register 297 as controlled by control line M. When loading of the bitstream begins, line M and a clock signal (not shown) cause multiplexers 296a and 296b to move data from 64-bit transfer register 298 to holding register 292. From there these words are applied to control logic 291. If the word is a header, control logic 291 interprets the word. If the op code indicates the data to follow are to be written unencrypted, control logic 291 places an address on bus G to select a register, places a signal on line L to cause multiplexer 294 to connect bus B to bus D, and applies the following word on bus B. On the next clock signal (clock signals are not shown), the data on bus D are loaded into the addressed register. The init CBC register for loading the initial cipher block chaining value and the password register PWD are each 64-bit registers, and each receive two consecutive 32-bit words. In one embodiment, the password is sent, by convention, as the last word in a given subdesign, though other conventions might also be used.

A modified CBC value formed from (1) the original CBC value stored in the init CBC register and (2) the initial frame address stored in the FAR register is available to decryptor 24. In one embodiment, the initial frame address in the FAR register uses no more than 32 bits while the init CBC value uses 64 bits. In the embodiment of FIG. 5, the 64-bit bus providing the modified CBC value includes 22 bits from the frame address register FAR and 42 bits from the init CBC register. This value depends upon where configuration data will be loaded. If an attacker were to try to load encrypted data into a different place by changing the contents of the FAR register, the modCBC value fed to decryptor 24 would also change.

The decryption process begins when control logic 291 receives an op code command to decrypt a number of words of configuration data. Control line M causes multiplexer 296a to apply data from transfer register 298 to bus A leading to assembly register 297. Control bus H alternately connects bus A to the High[31:0] and Low[31:0] portions of encrypted data register 297 to form a 64-bit word to be decrypted. Control logic 291 then asserts the Enc_data_rdy signal, which causes decryptor 24 to decrypt the data in register 297.

To perform the decryption, decryptor 24 applies a key address KeyAddr on bus 28 to key memory 303 within memory 23. This causes key memory 303 to return the 56-bit key in that address on the 56-bit Key lines. It also causes key memory 303 to return two additional bits "Order" also stored in the key data at that address. For the first decryption key, these two bits must indicate that this is a first key or an only key. If not, decryptor 24 asserts the Bad_key_set signal, which causes control logic 29 to abort the configuration operation. If these two bits indicate the key is a first or only key, decryptor 24 performs the decryption, using for example the well-known DES algorithm. The DES algorithm is described by Bruce Schneier in "Applied Cryptography Second Edition: protocols, algorithms, and source code in C" copyright 1996 by Bruce Schneier, published by John Wiley & Sons, Inc., at pages 265–278, which is incorporated herein by reference.

If the key isn't an only key, decryptor 24 then gets the key at the next address in key memory 303 and checks to see whether the two Order bits indicate it is a middle or last key. If not, the Bad_key_set signal is asserted and the configuration is aborted. If so, decryption is performed. If it is a middle key, another round of decryption is done. If it is the last key, decryptor 24 forms the XOR function of the decrypted word and the value modCBC. Decryptor 24 then places the resultant value on the 64-bit Decrypted_data bus and asserts the Dec_data_rdy signal. This causes control logic 291 to place signals on control line K to cause multiplexer 295 to break the 64-bit word into two sequential 32-bit words. Control logic 291 places a signal on line L to cause multiplexer 294 to forward the 32-bit words of decrypted data to bus D. Control logic 291 also places address signals on bus G to address frame data input register FDRI. The next clock signal moves the decrypted data to bus E where it is loaded into the frame register and when the frame register is full, eventually shifted into configuration memory 12 at the address indicated in the FAR register.

The modCBC value is used only once in the decryption operation. Subsequent 64-bit words of encrypted data are decrypted and then chained using the previously decrypted data for the XOR operation. (The value stored in the FAR register is also used only once to select a frame address. Subsequently, the frame address is simply incremented every time a frame is filled.) In one embodiment, the last 64-bit block of encrypted data is written to register PWD. When the decryption is complete for a given subdesign, the password in register PWD is compared with a preloaded value in a non-volatile memory location 300 within memory 23. If the password does not match the preloaded value, configuration fails; otherwise, the configuration process moves to the next subdesign, if any.

A second embodiment eliminates the need to preload the shared password into non-volatile memory. In that embodiment, those who contribute to the designs expressed in the configuration bitstream agree upon a password. The bitstream associated with the first-loaded subdesign is then used to store a password address in a password-select register PWS and the password both in register PWD and in a memory location 302, typically SRAM, identified by a value stored in register PWS. Subsequent configuration data associated with other subdesigns then have their decrypted passwords checked against the value stored in memory location 302. (Memory location 302 and password select register PWS are cross-hatched to illustrate their association with the second embodiment.)

In accordance with a third embodiment, a message-authentication code (MAC) for each subdesign is pre-calculated off chip by the author of a subdesign and is subsequently loaded with the subdesign bitstream into NVM 300, before configuration, at an address corresponding to the order that the subdesign is to be loaded into the PLD. (In the present disclosure, a "MAC" is any result of a one-way function used to authenticate a design or subdesign.) A MAC generator 304 then calculates the MAC for each subdesign as the subdesign is loaded and compares the result with the respective MAC in NVM 300. This embodiment does not require the password register PWD, password-select register PWS, or memory 302, but one or more of these may nevertheless be included to support more than one method of protecting proprietary configuration data. An XOR gate 305 graphically depicts the comparison between the MAC from MAC generator 304 and the associated value stored in memory 303. (MAC generator 304 and XOR gate 305 are shaded to illustrate their association with the third embodiment.)

For a more detailed discussion of how one might perform a hash function on a design to develop a MAC for the design, see U.S. application Ser. No. 09/253,401 entitled "Method and Apparatus for Protecting Proprietary Configuration Data for Programmable Logic Device," by Stephen M. Trimberger, which is incorporated herein by reference. Another way to make a MAC is described by Schneier in "Applied Cryptography, Second Edition," (1996) on page 456. Schneier describes a way to make a key-dependent one-way hash function by encrypting a message with a block algorithm in the CBC mode, as specified in ANSI X9.9, a United States national wholesale banking standard for authentication of financial transactions. ANSI X9.9 is incorporated herein by reference.

In another embodiment, the author of one subdesign computes a MAC for his or her subdesign and then shares the MAC with the authors of other subdesigns for incorporation into their respective bitstreams. Upon loading the bitstream of the first subdesign, MAC generator 304 computes and stores the MAC of the first subdesign. The MAC may be calculated from either the encrypted or the decrypted bitstream. Subsequently loaded subdesigns must include the stored MAC.

Figure 6:
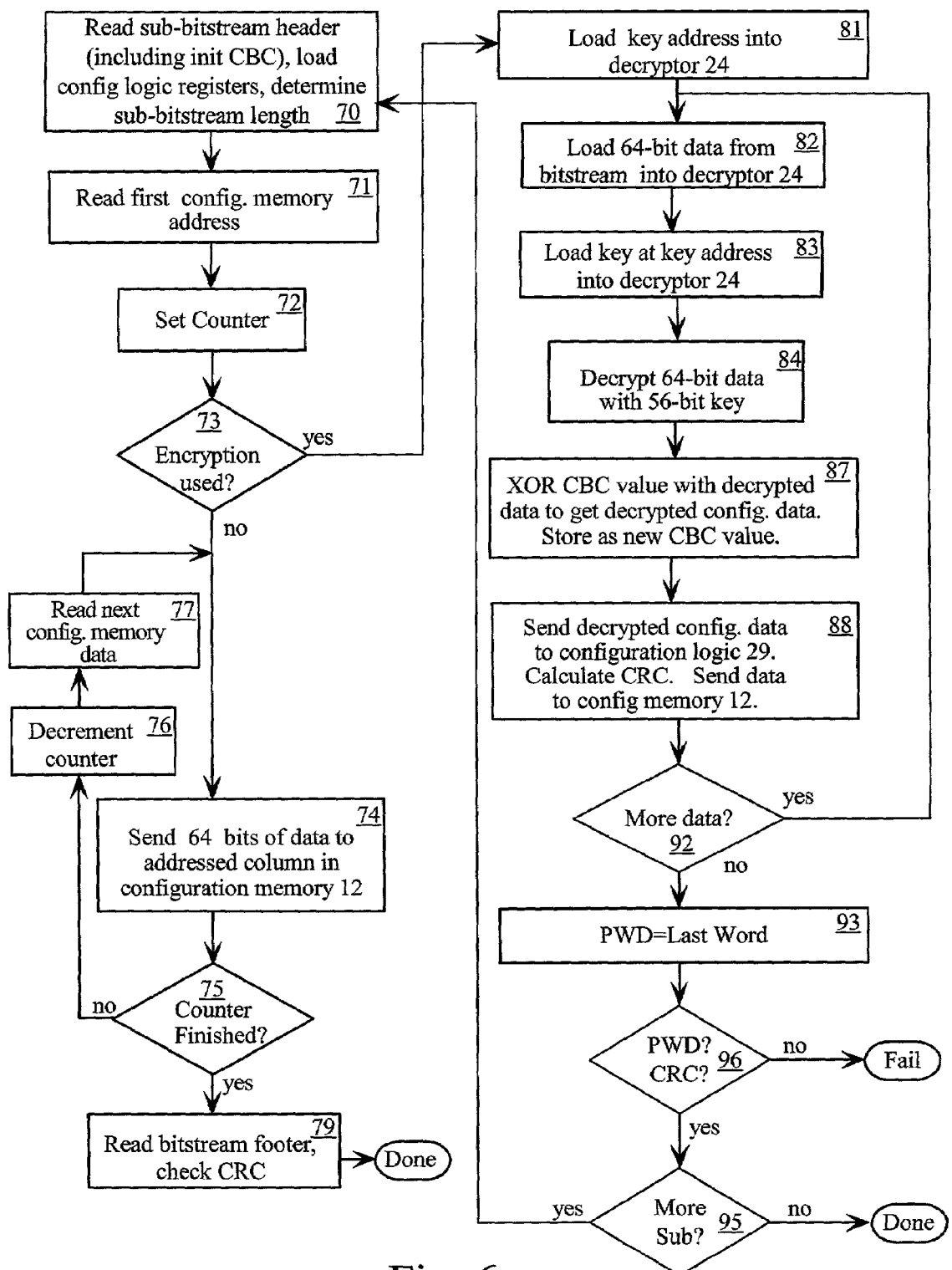
FIG. 6 illustrates the flow of operations performed by configuration logic 29 and decryptor 24 in accordance with the embodiment in which a shared password is stored in non-volatile memory 300.

FIG. 6 illustrates the flow of operations performed by configuration logic 29 and decryptor 24 in accordance with an embodiment in which a shared password is stored in non-volatile memory 300. Configuration logic 29 begins at step 70 by loading the first bitstream header and placing the corresponding data into configuration logic registers (not shown). At step 71, as a further part of the start-up sequence, configuration logic 29 reads the first configuration memory address. Recall that the bitstream format includes an op code that indicates whether encryption is being used. At step 72, configuration logic 29 sets a counter (not shown) equal to the bitstream word count. Step 73 branches on the op code value. If encryption is not used, the process is shown on the left portion of FIG. 6. If encryption is used, the process is shown in the right of FIG. 6.

At step 74, 32 bits (1 word) of configuration data are sent to the addressed frame of configuration memory 12. If step 75 indicates the counter is not finished, then at step 76 the counter is decremented and the next word of configuration data is sent to configuration memory 12. When the counter has finished, configuration logic 29 performs cleanup activities, including reading the final cyclic redundancy check value to compare with a value at the end of the bitstream to determine whether there were any errors in loading the bitstream.

If step 73 indicates the bitstream is encrypted, at step 81 the process loads the initial key address from key address register 293 (FIG. 5) into decryptor 24. The counter is used, in part, to determine which is the last word associated with a given subdesign, the last word being the password to be loaded into register PWD.

At step 82, two words (64 bits) of encrypted configuration data are loaded into decryptor 24. At step 83 the addressed key is loaded into decryptor 24. In one embodiment, a 64-bit number is loaded into decryptor 24. This 64-bit number includes a 56-bit key and some other bits that may be unused, used for parity, or used for another purpose. For example, an embodiment that supports multiple-key encryption/decryption described in the above-mentioned Pang et al. U.S. patent application Ser. No. 09/724,652 entitled "PROGRAMMABLE LOGIC DEVICE WITH DECRYPTION ALGORITHM AND DECRYPTION KEY" employs two of these bits to indicate whether a given key is the first, middle, last, or only key used with a collection of encrypted data. In another embodiment, extra bits are not present and the key data uses less than 64 bits.

At step 84, decryptor 24 decrypts the 64-bit data with the 56-bit key using, for example, the DES algorithm. The DES algorithm is described in the above-mentioned book by Bruce Schneier at pages 265 to 278. Other encryption algorithms may also be used, for example, the advanced encryption standard AES. Other algorithms may require more key bits and more data bits in each block. For example AES requires a key of 128 to 256 bits.

At step 87, the modified CBC value shown in FIG. 5 as a 64-bit value from combining registers FAR and init CBC is XORed with the decrypted value obtained in step 87 inside decryptor 24. In one embodiment, 22 bits of the 64-bit random number loaded into the CBC register are replaced with the frame address of the beginning of the bitstream. The goal of the encryption process is to have every digit of the 64-bit encrypted value be a function of all previous bits plus the key. The goal of combining the CBC value with the first address is to cause the decrypted values to change if the bitstream is loaded into a different address from the intended starting address. Step 87 achieves both goals. The new CBC value is then stored. Storage may be in the FAR and init CBC registers shown in FIG. 5, or in another register.

At step 88, this decrypted configuration data is sent on bus 27 (FIG. 3) to configuration logic 29. Configuration logic 29 calculates an updated cyclic redundancy check (CRC) value to be compared with the cyclic redundancy value stored in the CRC register at the end of the loading process. If configuration logic 29 has been set to use encryption, a multiplexer in configuration logic 29 forwards this decrypted configuration data to the addressed column of configuration memory 12. In one embodiment, the FPGA includes a circuit, not shown, such as described by Erickson in U.S. Pat. No. 5,598,424 (incorporated herein) to calculate a CRC value from the bitstream as the bitstream is being loaded, and protects against glitches in the bitstream voltages that might cause incorrect bits to be loaded.

At decision 92, the counter is checked to determine whether there is more data associated with the subdesign bitstream. If not finished, the counter is decremented and the process returns to step 82 where the next 64 bits (2 words) are loaded from the bitstream; otherwise, step 93 sets the value in register PWD to the last word. Finally, at decision 90, a CRC (cyclic redundancy check) value in the bitstream is compared with a CRC value calculated as the bitstream is loaded, and the password within memory 300 is compared with the decrypted password in register PWD. The calculated and stored CRC values must match or the design is assumed to be corrupt; the decrypted and stored passwords must also match to verify the source of the configuration data. A mismatch between the CRCs or between the passwords generates a loading error, and the configuration process aborts. If the CRCs and passwords do match, the process either continues to the next subdesign, if any, (decision 95) or the FPGA is operational.

In the depicted embodiment, each subdesign is encrypted with a single encryption key. Other embodiments employ multi-key encryption and decryption, as discusses in the above-incorporated Pang et al. reference.

Figure 7:
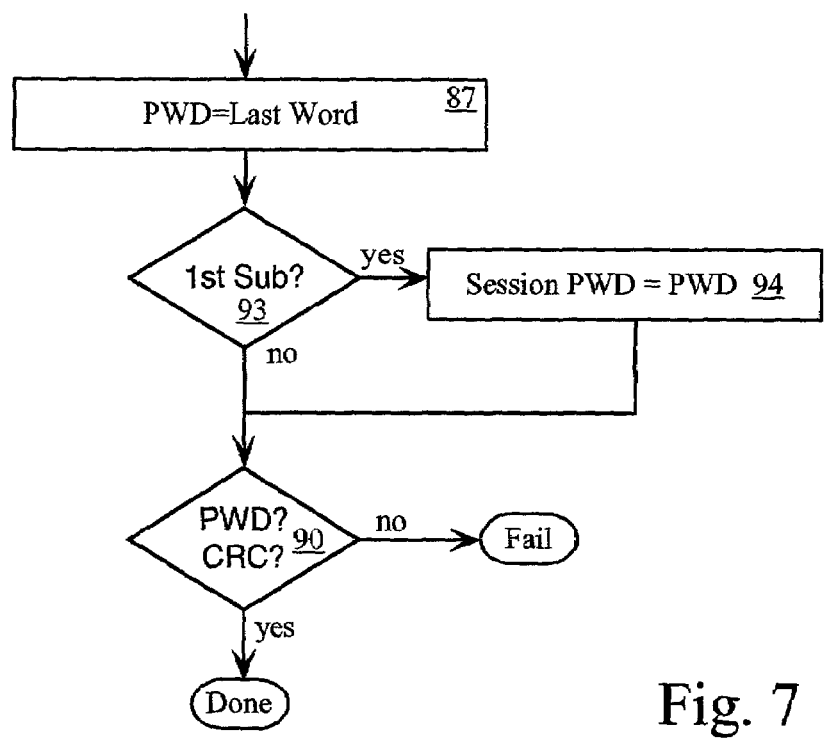
FIG. 7 illustrates the flow of operations performed by configuration logic 29 and decryptor 24 of FIGS. 3 and 5 in accordance with the embodiment in which the shared password is stored by the bitstream associated with the first subdesign and later used to verify subsequent subdesigns.

FIG. 7 illustrates the flow of operations performed by configuration logic 29 and decryptor 24 in accordance with the embodiment in which the shared password is stored by the bitstream associated with the first subdesign and later used to verify subsequent subdesigns. The flow is identical to that discussed above in connection with FIG. 6 through step 93; the redundant portions are omitted for brevity.

After the last word is loaded into register PWD, configuration logic 29 determines whether the subdesign being loaded is the first subdesign (decision 93); if so, then the shared session password in register PWD is stored within memory location 302 identified by a value stored in register PWS (step 94). If the subdesign being loaded is not the first, then the password associated with the subdesign is compared with the password loaded into memory 302 by the first subdesign. Decision 90 and the steps that follow are identical to those discussed in connection with FIG. 6.

As noted above, in one embodiment the session password is a MAC calculated on the first subdesign and shared with the authors of other subdesigns. In accordance with that embodiment, the flow of FIG. 7 is modified so the MAC is calculated on the first subdesign and the resulting value is stored as the session password for comparison with the passwords in subsequently loaded subdesigns.

Figure 8:
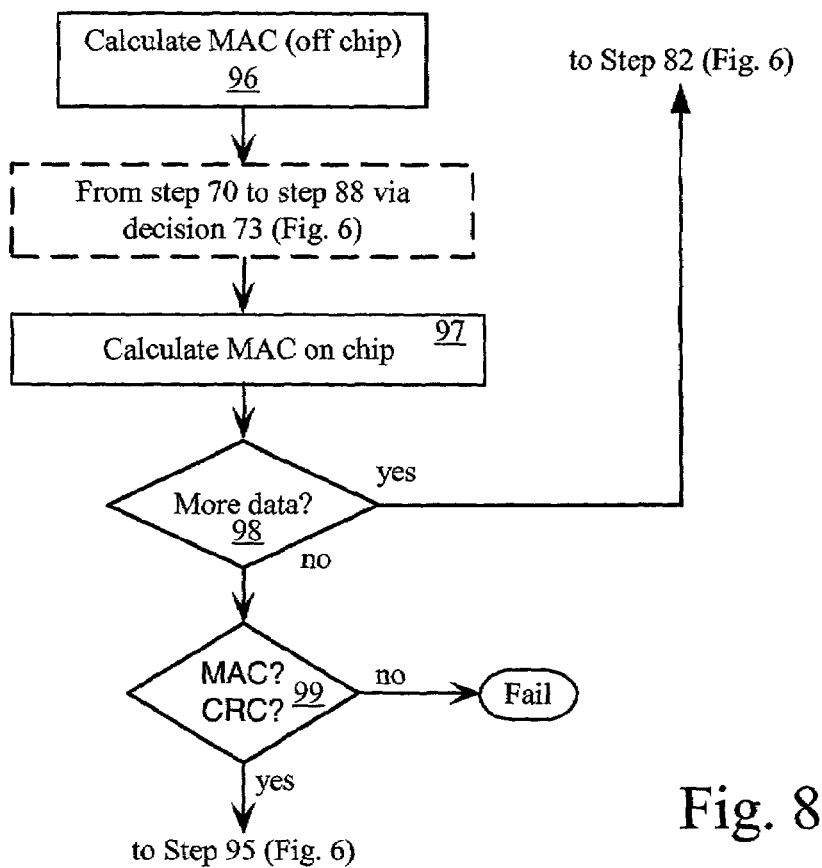
FIG. 8 illustrates the flow of operations performed by configuration logic 29 and decryptor 24 in accordance with the embodiment in which a MAC value is stored in memory 300 for each subdesign.

FIG. 8 illustrates the flow of operations performed by configuration logic 29 and decryptor 24 in accordance with the embodiment in which a MAC value is stored in memory 300 for each subdesign. The flow is identical to that discussed above in connection with FIG. 6 through step 88; the redundant portions are omitted for brevity.

Beginning at step 96, the MAC associated with a given subdesign is calculated off chip (e.g., by a computer) and inserted into the bitstream header of a subdesign. Configuration logic 29 then begins the configuration process at step 70 (FIG. 6) by loading the first bitstream header and placing the corresponding data into configuration logic registers. In the embodiment of FIG. 8, configuration logic 29 also loads the pre-calculated MAC into memory 300 (FIG. 5).

After step 70, the process continues from step 71 to step 88, via decision 73, as discussed above in connection with FIG. 6. Then, in step 97, MAC generator 304 calculates the MAC associated with the decrypted word of the subdesign being loaded (step 97). At decision 98, the counter is checked to determine whether there is more data associated with the subdesign bitstream. If not finished, the counter is decremented and the process returns to step 82 where the next 64 bits (2 words) are loaded from the bitstream; otherwise, the process moves to decision 99 with the value in MAC generator 304 representing the MAC for the bitstream segment representing the subdesign being loaded. In decision 99, the CRC (cyclic redundancy check) value in the bitstream is compared with a CRC value calculated as the bitstream is loaded, and the MAC provided by MAC generator 304 is compared with the associated MAC value in memory 300. The calculated and stored CRC values must match or the design is assumed to be corrupt; the calculated and stored MACs must also match to verify the source of the configuration data. If the CRC and MACs do not match, a loading error has occurred and the configuration process aborts. If the CRC and MACs do match, the process continues to the next subdesign, if any, or the FPGA is operational.

In another embodiment, the MAC of the first of a plurality of subdesigns is calculated and stored as a session password instead of a password sent explicitly as part of the first subdesign. All remaining subdesigns then submit a password that matches the calculated MAC of the first subdesign.

Figure 9A:
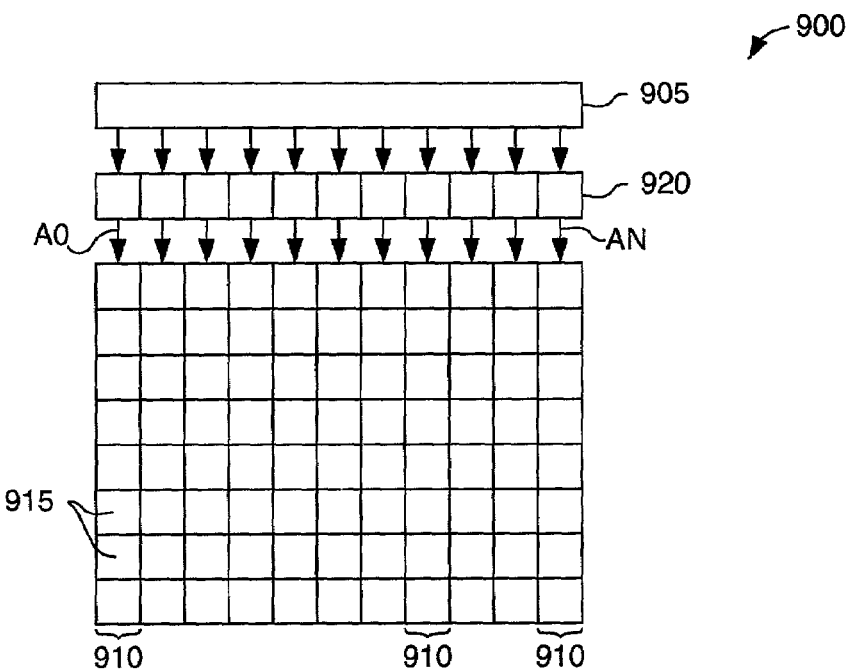
FIGS. 9A and 9B depict a configuration-memory array 900 adapted in accordance with one embodiment of the invention to disallow the overwriting of frames of configuration data.

FIG. 9A depicts a configuration-memory array 900 adapted to disallow the overwriting of frames of configuration data. This embodiment prevents a Trojan Horse attack in which a PLD is programmed with a sequence of designs that gradually overwrite frames of data using circuits designed to uncover the program states of memory cells in other frames.

Array 900 conventionally includes a frame address register 905 connected via a number N of address lines A0-AN to a plurality of memory frames 910. Each of frames 910 in turn includes a plurality of memory cells 915, each of which is adapted to store a single configuration bit. As is conventional, array 900 is loaded frame-by-frame with configuration data that defines the functionality of the associated PLD.

In accordance with this embodiment, array 900 also includes a collection of "been written" memory elements 920 that store information indicating which, if any, of frames 910 have been written to. Memory elements 920, collectively termed "frame-access-protection circuitry," prevent the overwriting of any frame in array 900 previously loaded with configuration data, and consequently prevent "Trojan horse" designs from occupying previously configured frames.

Figure 9B:
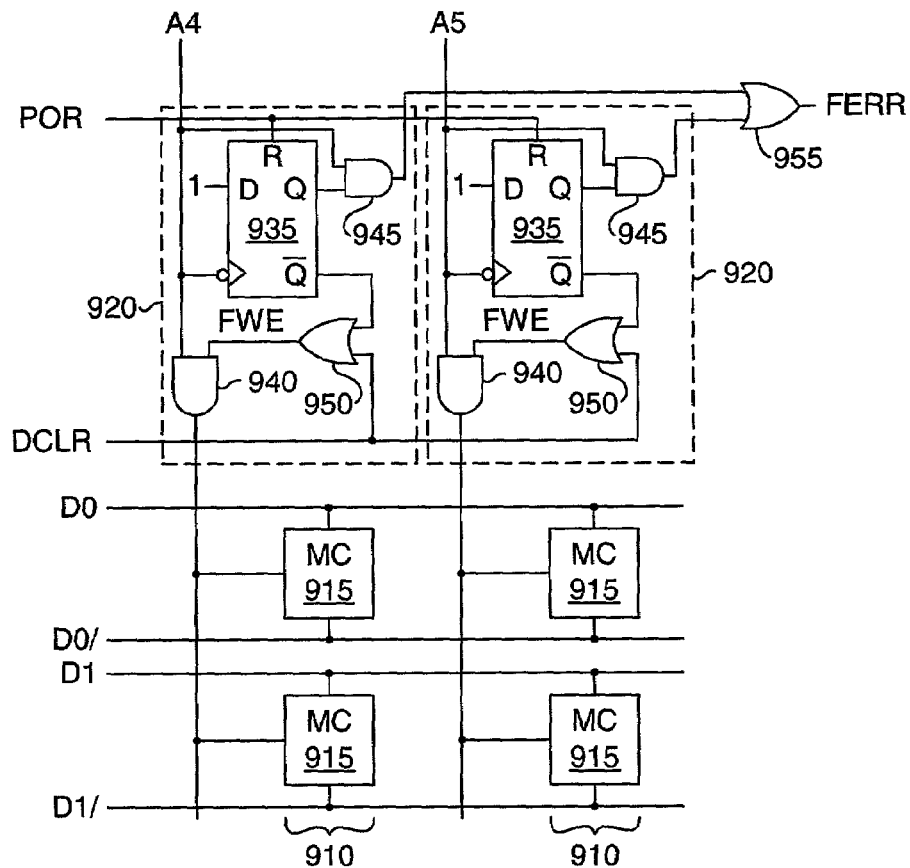

FIG. 9B depicts a portion of an embodiment of array 900 in more detail, including a portion of two frames 910 and associated "been-written" memory elements 920. In the depicted embodiment, each memory element 920 includes a D flip-flop 935, a pair of AND gates 940 and 945, and an OR gate 950. There is one memory element 920 for each frame, but other embodiments may have fewer. Address register 905 is not shown in FIG. 9B, but a pair of address lines A4 and A5 that extend from register 905 are shown connected to memory elements 920.

The following describes the function of the left-most frame 910 of FIG. 9B, the frame associated with address line A4; the remaining frames are identical. Memory cells 915 and flip-flops 935 are initialized before frames 910 receive configuration data. The initialization process writes logic zeros to each memory cell 915. First, a power-on-reset (POR) or similar global reset signal on terminal POR resets each flip-flop 935 to logic zero. While the POR signal is asserted, a device-clear signal DCLR on a like-named terminal is automatically asserted while a logic zero is written to each memory cell 915. The device-clear signal DCLR enables AND gates 940 via OR gates 950 to convey the address signals to the frames being reset. Some embodiments support partial reconfiguration by providing independent control of frames 910 and associated memory elements 920.

Once reset, each frame 910 is prepared to receive configuration data. To write configuration data into the memory cells 915 associated with address line A4, configuration logic 29 (FIG. 3) brings address line A4 high, to a logic one, and then presents the appropriate configuration data on complementary bitlines (e.g., D0 and D0/). Flip-flop 935, being reset, provides a logic one from complementary output terminal Q-bar to a "frame-write-enable" terminal FWE of AND gate 940 via OR gate 950. The logic one input to AND gate 940 from flip-flop 935 enables memory element 920 to pass the appropriate address signal on line A4 to the associated frame 910. Once each memory cell 915 within the left-most frame 910 is configured, configuration logic 29 deselects address line A4 and repeats the process for the next frame 910 (assuming the next frame is to be written to).

Deselecting address line A4 produces a falling edge on the clock terminal of flip-flop 935, causing the Q and Q-bar outputs to transition to logic one and logic zero, respectively. Consequently, the complementary output Q-bar presents a logic zero through OR gate 950 to frame-write-enable terminal FWE of the associated AND gate 940. AND gate 940 will consequently block any further address signals on line A4 until flip-flop 935 and the associated frame is reset. Memory element 920 thus bars write access to the associated memory frame 910, leaving the remaining "empty" frames 910 free to receive configuration data. In one embodiment, the frames can only be reset using a command that purges all frames on the PLD. A Trojan Horse design is thus prevented from occupying any frame formerly occupied by a proprietary collection of configuration data when any portion of the proprietary collection of configuration data remains in configuration memory.

AND gates 945 and OR gate 955 are provided, in one embodiment, to generate a frame-error signal FERR in response to an attempt to overwrite a frame. The frame-error signal is generated if a address line is brought high after one of flip-flops 930 is set, indicating an attempted write to an occupied frame. In practice, OR gate 955 would include an input from a memory element 920 for each overwrite-protected frame.

The depicted embodiment includes a register for each frame. Other embodiments might employ fewer memory elements to identify those memory frames storing configuration data. In other embodiments, for example, the PLD can be modified as follows:

1. a register with N memory elements can be decoded to select from among $2^N$ memory frames;
2. some frames may be re-written without resetting the entire device;
3. the frames might be an arrangement of memory cells, other than columns, adapted to store a subset of configuration data;
4. a memory can be included to store a range of frame addresses corresponding to frames that have been written to; and
5. a memory can be included to store the highest (or lowest) frame address written, and the PLD can use the stored address to disallow writes to filled frames.

In each of the above-described embodiments, decryption keys are loaded into memory 24 via an access port (e.g., the configuration access port or the JTAG access port) of FPGA 31. As the keys are loaded, an attacker who monitors the data on the access port can easily violate the privacy of the keys, e.g. by putting probes on board traces. Such attacks are not normally a problem, as a manufacturer interested in maintaining the secrecy of the design typically loads the keys; however, maintaining key security is more difficult when logic designs are updated in the field, and it would be desirable to relieve the manufacturer of the onus of maintaining key security.

Figure 10A:
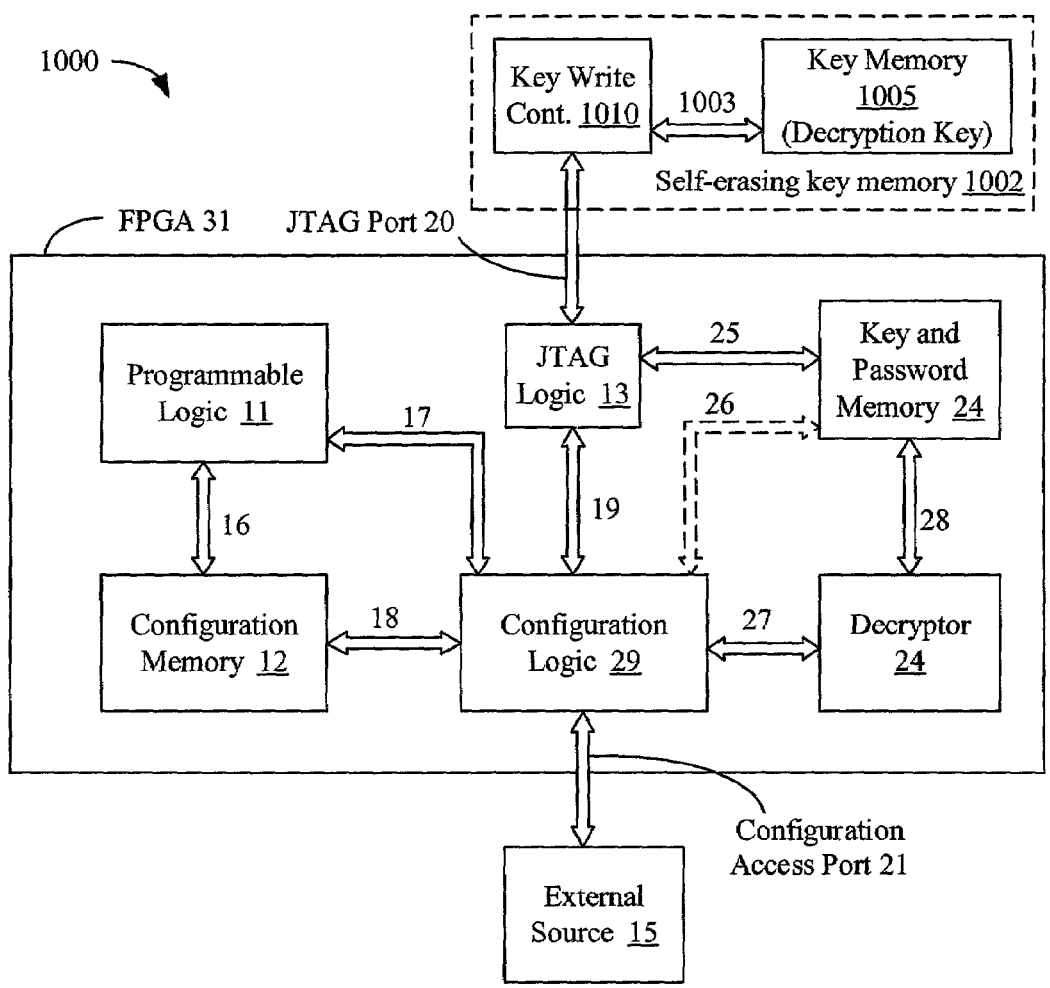
FIG. 10A is a block diagram of a programmable logic system 1000 in accordance with an embodiment of the invention that provides improved key security and simplifies the process of upgrading FPGAs in the field using proprietary configuration data.

FIG. 10A is a block diagram of a programmable logic system 1000 that provides improved key security and simplifies the process of upgrading FPGAs in the field using proprietary configuration data. Some elements of FIG. 10A are the same as shown in FIG. 3, are given the same reference numbers, and not explained again. In addition, FIG. 10A includes a self-erasing key memory 1002 that automatically erases itself of sensitive decryption keys after delivering the keys to FPGA 31. Self-erasing key memory 1002 includes a key memory 1005 connected to JTAG port 20 of FPGA 31 via a bus 1003 and some key-write control circuitry 1010. As detailed below, key-write control circuitry 1010 transfers one or more decryption keys within memory 1005 into key and password memory 24 before FPGA 31 is first configured. Key-write control circuitry 1010 then automatically clears those keys from memory 1005 so the keys are no longer accessible from outside FGPA 31.

Memory 1005 might be one of the Xilinx XC18V00 Series of In-System Programmable Configuration PROMs; Key-write control circuitry 1010 might be a member of the Xilinx XC9500 In-System Programmable CPLD Family. Key memory 1005 preferably includes an array of non-volatile memory that does not require power to maintain data in the array.

Figure 10B:
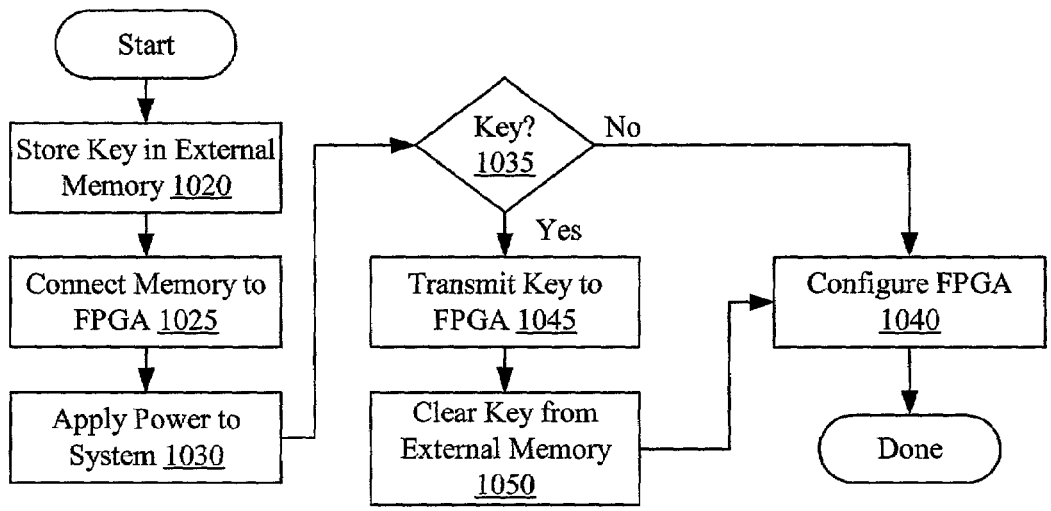
FIG. 10B is a flowchart illustrating the operation of memory 1005 and key-write control circuitry 1010.

FIG. 10B is a flowchart illustrating the operation of memory 1005 and key-write control circuitry 1010. First, one or more decryption keys are stored in memory 1005 by e.g. the manufacturer of system 1000 (step 1020, FIG. 10B). Memory 1005 can be programmed either as a portion of system 1000 or before inclusion in system 1000. The decryption key(s) in memory 1005 must match those used to encrypt the configuration data stored within external source 15, so memory 1005 and memory source 15 will typically be provided as a set. In another embodiment, Key-write control circuitry 1010 is adapted to include key memory 1005. In yet another embodiment, a single integrated circuit connected to an access port of FPGA 31 is adapted to perform all the functions of external source 15, key memory 1005, and key-write control circuitry 1010.

In embodiments in which the key or keys are pre-loaded in memory 1005, the key-bearing memory 1005 is physically added to system 1000 (step 1025). Next, power is applied to system 1000 (step 1030), which conventionally initiates a configuration cycle. Key-write control circuitry 1010 then checks memory 1005 for a key (decision 1035): if there is no key in memory 1005, FPGA 31 configures normally using data from external source 15 (step 1040). If there is a key in memory 1005, key-write control circuitry 1010 retrieves the key from memory 1005 and transmits the key FPGA 31, where the key is stored in key memory 24 (step 1045). Key-write control circuitry 1010 then clears the key from memory 1005 by issuing a clear command on bus 1003 (step 1050) and FPGA 31 configures normally (step 1040).

In an embodiment in which key memory 1005 is a Xilinx ISP ROM, key-write control circuitry 1010 and memory 1005 communicate using the Xilinx serial-PROM protocol, and key-write control circuitry 1010 communicates with JTAG logic 13 using the JTAG standard.

Encrypted configuration data cannot be properly loaded into a PLD without the correct key, so it is important to verify the integrity of decryption keys stored in programmable logic devices. However, due to the secure nature of the keys, it is equally important to maintain the secrecy of the keys during key verification.

Figure 11A:
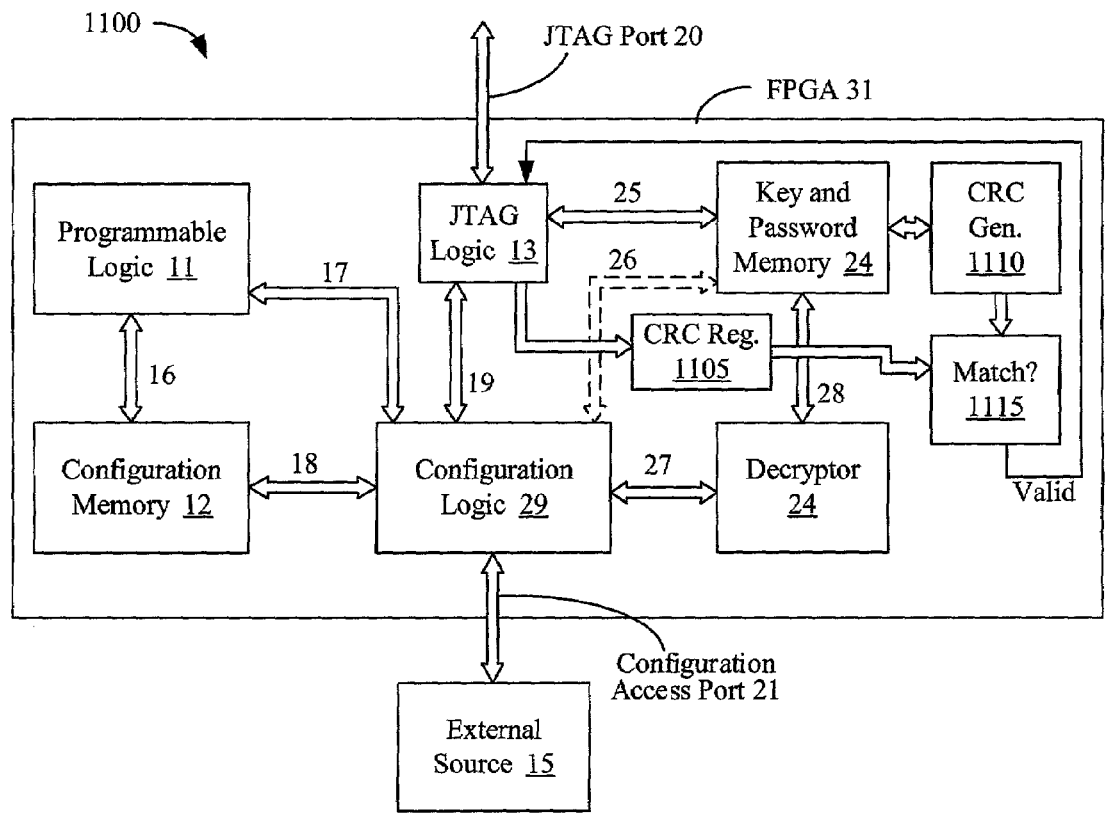
FIG. 11A depicts a system 1100 in accordance with an embodiment of the invention that allows users to verify the validity of decryption keys without allowing users access to the keys.

FIG. 11A depicts a system 1100 in accordance with an embodiment of the invention that allows users to verify the validity of decryption keys without allowing users access to the keys. System 1100 is similar to FIGS. 3 and 10, like-numbered elements being the same. System 1100 differs from those embodiments in that system 1100 includes a CRC register 1105, a CRC generator 1110, and "match" circuit 1115. Although some hardware may be shared, this CRC check is a check on the data in key and password memory 24, not a check on configuration data, as was the case with the CRC register shown in FIG. 5 and checked in step 90 in FIG. 6.

Figure 11B:
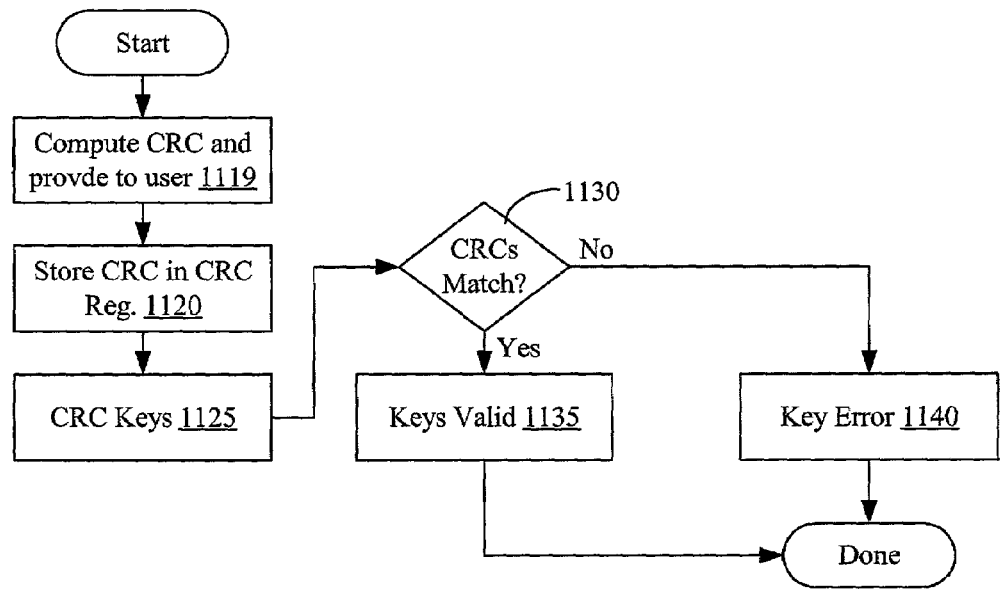
FIG. 11B is a flowchart depicting the operation of system 1100.

FIG. 11B is a flowchart depicting the operation of system 1100. First, an entity authorized to have key access performs a CRC on the key (or keys) of interest and provides the resulting CRC value to a user interested in verifying key integrity (step 1119). To verify the integrity of the key, the user provides the CRC value to FPGA 31 via JTAG port 20. JTAG logic 13 stores the CRC value in CRC register 1105 (step 1120), which is provided for this purpose. CRC generator 1110 performs a CRC on the key within memory 24 (step 1125) and presents the resulting CRC value—a variable that is a function of the decryption key—to match circuit 1115. Match circuit 1115 then compares the CRC value in register 1105 with the CRC value from CRC generator 1110 (decision 1130): if the CRC values match, match circuit 1115 issues a "valid" signal to JTAG logic 13, indicating that the keys are valid (step 1135); if the CRC values to not match, match circuit 1115 does not issued the "valid" signal, indicating a key error to JTAG logic 13 (step 1140).

The embodiment of FIG. 11A employs a CRC, but other one-way functions might also be used. The CRC method is advantageously relatively simple to compute and difficult to reverse. Alternatively, the CRC can be calculated as keys are loaded and checked when the pre-computed CRC value is sent.

Figure 12A:
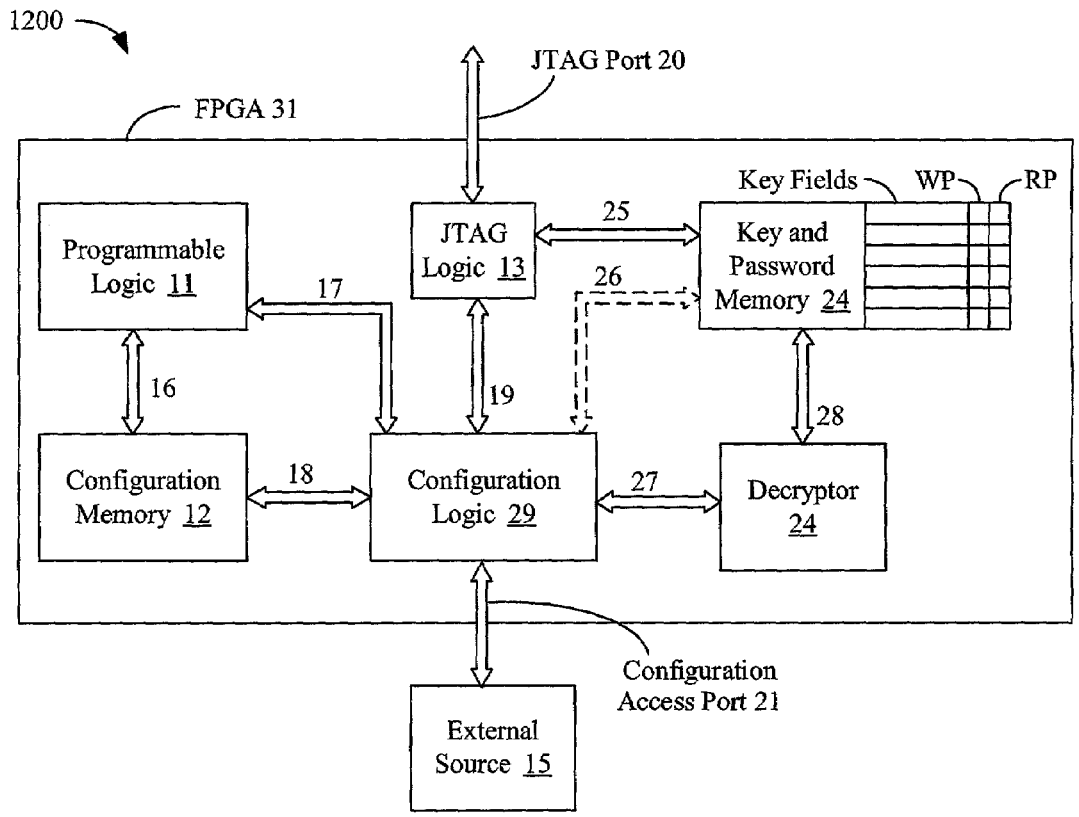
FIG. 12A depicts a system 1200 in accordance with another embodiment of the invention that allows users to verify the validity of decryption keys without compromising key security.

FIG. 12A depicts a system 1200 in accordance with another embodiment of the invention that allows users to verify the validity of decryption keys without compromising key security. System 1100 is similar to FIGS. 3, 10, and 11A, like-numbered elements being the same. System 1100 differs from those embodiments in that memory 24 is modified to include a write-protect field WP and a read-protect field RP for each key field. A user may thus write a decryption key to one of the key fields in memory 24 and then set the associated read-protect and/or write-protect fields to disallow read and/or write access to the key field.

Figure 12B:
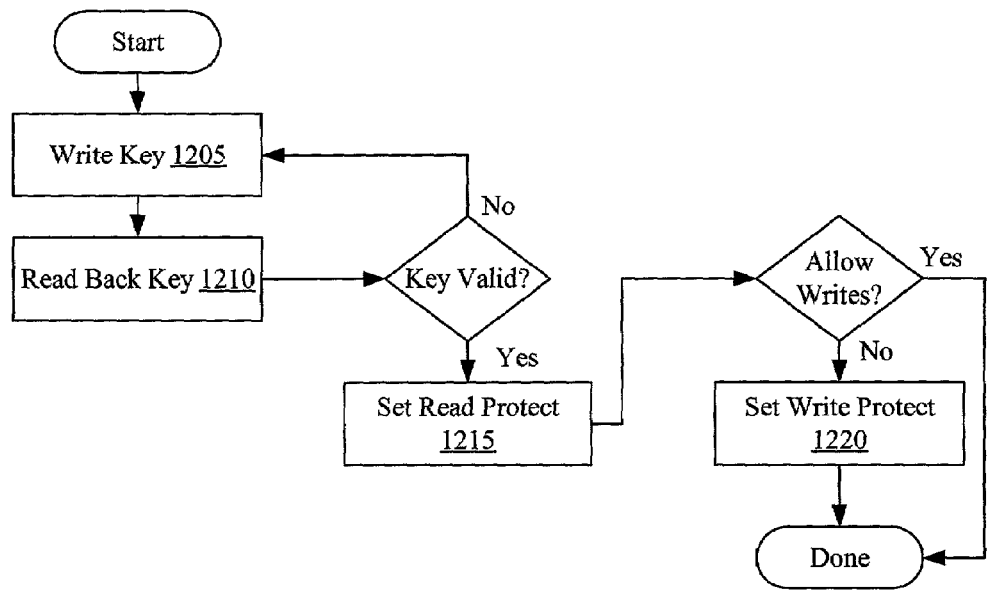
FIG. 12B is a flowchart depicting the operation of system 1200 of FIG. 12A.

FIG. 12B is a flowchart depicting the operation of system 1200 of FIG. 12A. The user first writes a decryption key into one of the key fields of memory 24 (step 1205). In one embodiment, writing to a key field automatically resets the read-protect field RP associated with that key field. Next, the user reads back the key stored in memory 24 to determine whether the key was stored correctly (step 1210). If the key in memory 24 is not stored correctly, the user may try again; otherwise, the user sets the read-protect field associated with the key field (step 1215). As with other methods described herein, the illustrated process can be automated (e.g., performed by software).

Setting the read-protect field bars any future read access to the stored key, but does not bar future use of the key field in which the key is stored. For example, the user may overwrite the stored key with the same or a different key. This possibility leaves system 1200 exposed to potential "Trojan Horse" attacks. The user therefore has the option of setting a write-protect field for one or all key fields to disallow writing any additional keys (step 1220).

Figure 13:
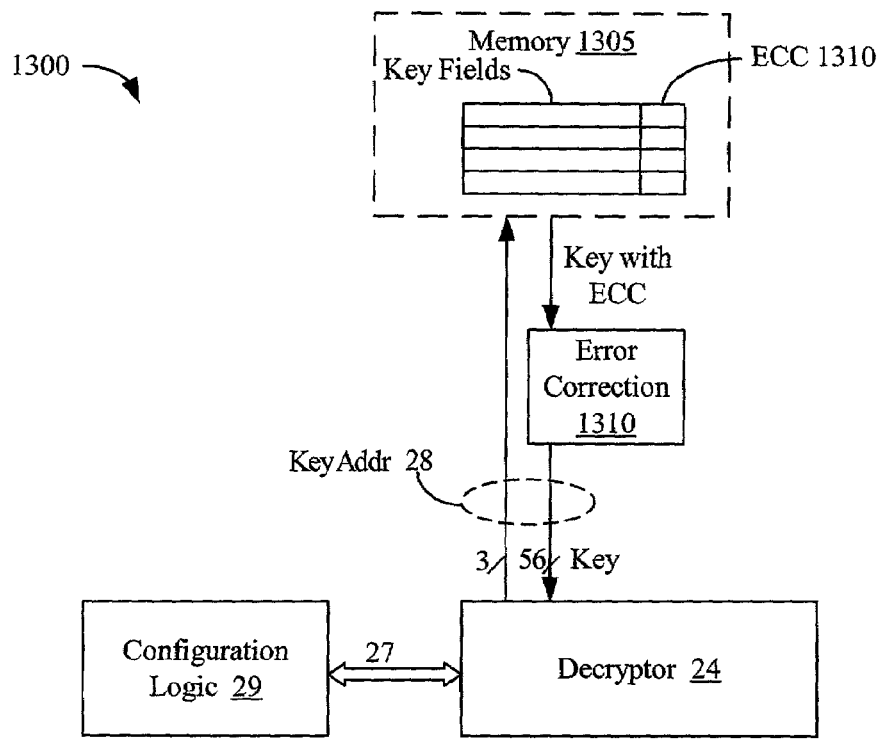
FIG. 13 depicts a system 1300 that address the problem of key errors using error correction.

FIG. 13 depicts a system 1300 that address the problem of key errors using error correction. System 1300 includes the same configuration logic 29 and decryptor 24 described in connection with FIG. 3. Memory 1305 is similar to memory 23 of FIG. 3, except each key field includes an associated error-correction-code (ECC) field 1310. The keys and associated ECCs are stored in memory 1305 in the same manner keys are stored in memory 23 of FIG. 3.

System 1300 additionally includes error-correction circuitry 1315 that receives each key and associated ECC and performs and error correction before conveying the resulting error-corrected key to decryptor 24. Error correction circuitry 1315 can perform, for example, the well-known Hamming error-correction technique.

Figure 14:
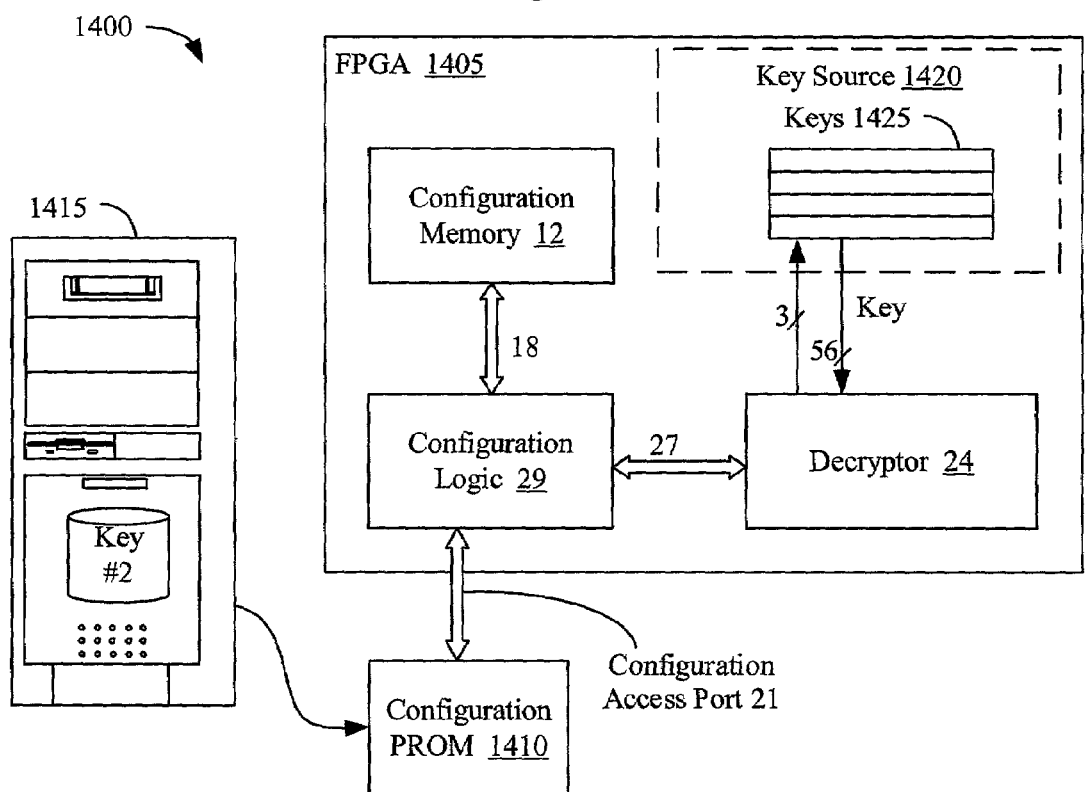
FIG. 14 illustrates a system 1400 for enabling users to encrypt proprietary configuration data.

FIG. 14 illustrates a system 1400 for enabling users to encrypt proprietary configuration data. System 1400 includes an FPGA 1405 much like FPGA 31 of FIG. 3, like-numbered elements being the same. System 1400 additionally includes some external configuration memory 1410 and some form of computer 1415 adapted to encrypt configuration data for storage in configuration memory 1410.

FPGA 1405 includes a key source 1420, in one embodiment a mask-programmable memory hardwired to include one or more decryption keys 1425. Because keys 1425 are hardwired, the user cannot choose his or her encryption/decryption key. Instead, the user specifies a decryption key in software stored in computer 1415 on e.g. and hard disk or some other form of computer-readable medium. For example, a user may specify in software that a given set of configuration data be encrypted using key #2. "Key #2" is hidden in software and is duplicated in memory 1420 at a key address associated in software with key #2. In this embodiment, the keys are never transmitted, so they cannot be probed; instead, only the key address is conveyed between computer 1415 and memory 1410.

Keys are hidden in software by obscurity. The user will not know where in the compiled code to look for the keys. Further, the keys can be broken up within the code, encrypted with yet another obscure key, etc., to render finding the key(s) more difficult.

Key source 1420 may generate keys instead of—or in addition to—storing keys. In one embodiment, for example, key source 1420 includes a circuit, such as a linear-feedback shift register (LFSR), for generating decryption keys. In such cases, computer 1415 is adapted to generate the appropriate encryption key. For example, computer 1415 might perform the LFSR algorithm for e.g. 100 clock cycles and use the resulting value for encryption; an LFSR in the FPGA receiving the bitstream would then generate the same value using the same algorithm and the same number of clock cycles.

Figure 15A:
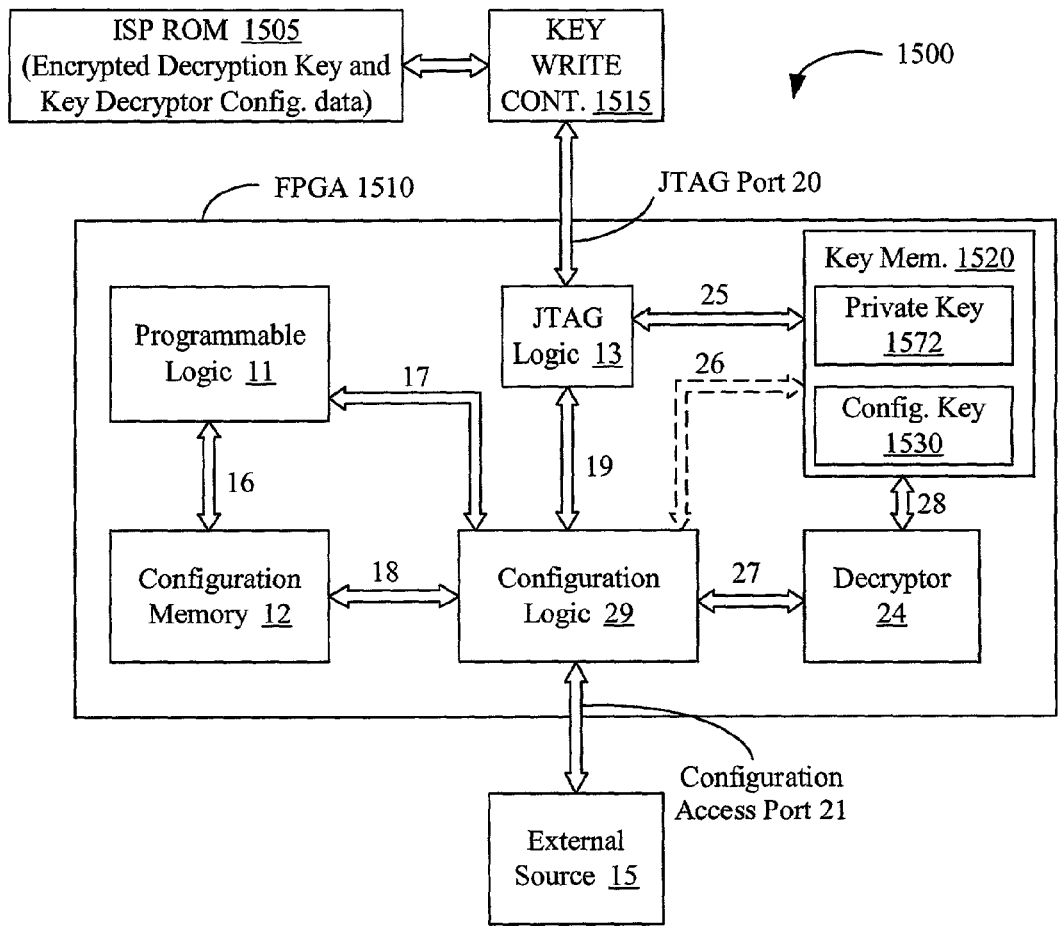
FIG. 15A depicts a programmable logic system 1500 in accordance with an embodiment of the invention in which decryption keys are themselves encrypted before they are transferred to a programmable logic device.

FIG. 15A depicts a programmable logic system 1500 in which decryption keys are themselves encrypted before they are transferred to a programmable logic device, thus ensuring the keys will not be compromised in transit. System 1500 includes an external key and configuration memory 1505 connected to an FPGA 1510 via a key-write control circuit 1515. FPGA 1510 is similar to FPGA 31 of FIG. 3, like-numbered elements being the same. Unlike FPGA 31, the key memory 1520 of FGPA 1510 includes one or more private-key fields 1525 adapted to store private decryption keys used to decrypt configuration-data decryption keys that were encrypted using a public-key encryption method. As in previously described embodiments, key memory 1520 also includes one or more key fields 1530 adapted to store decryption keys for decrypting encrypted configuration data.

Figure 15B:
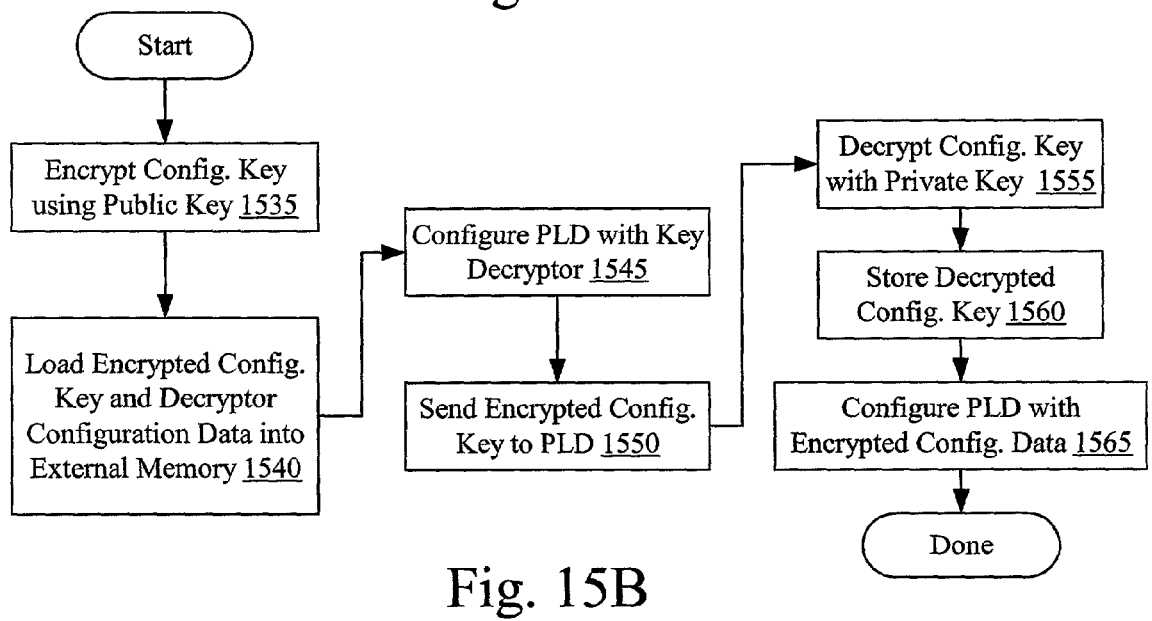
FIG. 15B is a flowchart depicting the operation of system 1500 of FIG. 15A.

FIG. 15B is a flowchart depicting the operation of system 1500 of FIG. 15A. Beginning at step 1535, a decryption key for decrypting configuration data (the "configuration key") is encrypted using a Public-Key Encryption algorithm such as the one available from RSA Data Security. Public-key encryption (also called asymmetric encryption) involves a pair of keys, a "public" key and a "private" key. In the general case, the public key is published and the corresponding private key is kept secret. Data encrypted with a given public key can be decrypted only with the corresponding private key. Once encrypted using the public key, the configuration key is stored in memory 1515 along with some additional, non-encrypted, configuration data (step 1540). This second set of configuration data specifies a programmable-logic instantiation of an RSA decryptor. Key-write control circuitry 1515 then loads configuration memory 12 with the configuration data in memory 1505 specifying an RSA decryptor, and consequently instantiates the decryptor on FPGA 1510 (step 1545).

Next, key-write control circuitry 1515 enables FPGA 1510 and sends the encrypted configuration key to FPGA 1510 (step 1550). Configuration logic 29 then retrieves the private counterpart of the public key used to encrypt the configuration key and uses the decryptor instantiated in programmable logic 11 to decrypt the configuration key (step 1555). Configuration logic 29 stores the decrypted configuration key in configuration-key field 1530 (step 1560). Finally, key-write control circuitry 1515 resets FPGA 1510 to allow FPGA 1510 to configure itself using the encrypted configuration data in external source 15 (step 1565). In one embodiment, key-write control circuitry 1515 is a Xilinx CPLD, and memory 1505 is a Xilinx ISP ROM.

U.S. patent application Ser. No. 09/724,652, entitled "PROGRAMMABLE LOGIC DEVICE WITH DECRYPTION ALGORITHM AND DECRYPTION KEY," by Pang et al., and incorporated herein by reference, describes an FPGA with a key memory that can be operated in a secure mode or a non-secure mode. The non-secure mode allows the decryption keys to be read or written freely; the secure mode bars read and write access to the decryption keys. In that embodiment, entering the non-secure mode automatically deletes any stored decryption keys.

Figure 16A:
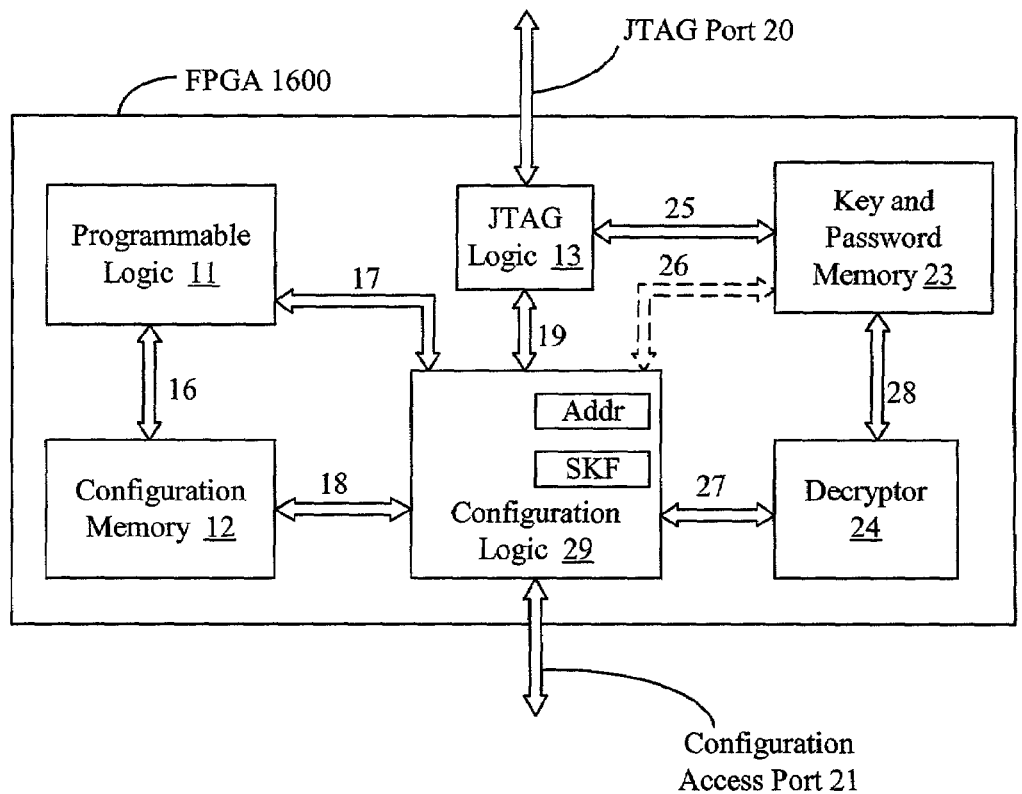
FIG. 16A depicts an FPGA 1600 in accordance with another embodiment of the invention.

FIG. 16A depicts an FPGA 1600 in accordance with another embodiment. FPGA 1600 is similar to the above-mentioned FPGA described by Pang et al.; however, FPGA 1600 provides additional flexibility by supporting secure and non-secure modes on a key-by-key basis. Users may therefore write, verify, and erase individual keys without affecting others.

FPGA 1600 includes configuration logic 1605 similar to configuration logic 29 of FIG. 3, but modified to include two additional configuration registers, a secure-key address register Addr and a "secure-key-field" register SKF.

Configuration logic 29 receives signals from JTAG bus logic 13. JTAG logic 13 conforms to the IEEE 1532 JTAG standard. Before key memory 23 can be accessed through JTAG bus 25, FPGA 1600 is placed in the non-secure mode by resetting (e.g., setting to a logic zero) the secure-key flag in register SKF and loading a key address into address register Addr. The selected address can then be written to or read from, leaving the remaining keys, if any, intact. Key memory 23 is written to and read from (for verification) over JTAG bus 25 using the ISC_PROGRAM and ISC_READ instructions of the IEEE 1532 standard.

Figure 16B:
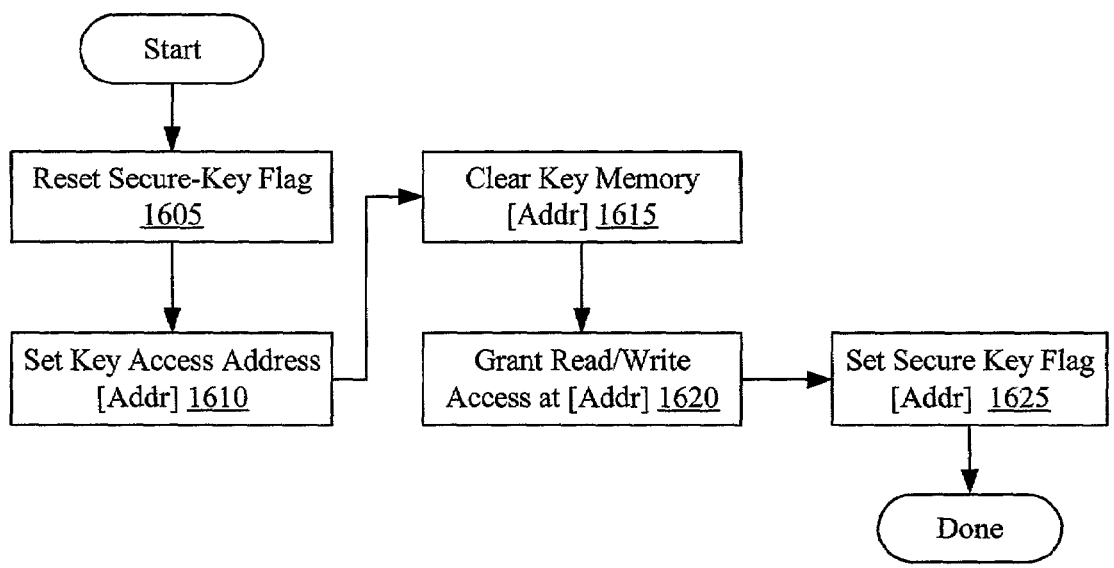
FIG. 16B is a flowchart depicting the operation of FPGA 1600 of FIG. 16A when accessing one of a number of key addresses in key and password memory 23.

FIG. 16B is a flowchart depicting the operation of FPGA 1600 of FIG. 16A when accessing one of a number of key addresses in key and password memory 23. Beginning at step 1605, the secure-key flag in register SKF is reset (e.g., to logic zero), placing FPGA 1600 in a non-secure mode. At this point, none of the key fields in memory 23 can be accessed (i.e., read from or written to).

Next, at JTAG instruction to JTAG logic 13 loads address register Addr with a desired key address (step 1610). This step automatically clears the contents, if any, of the selected memory location (step 1615), before granting access to the designated key field (step 1620). Clearing the memory before granting access prevents anyone from viewing previously stored keys.

After step 1620, the user can write or read to the designated key field until satisfied that the correct key is stored in memory 23. Next, in step 1625, the user sets the secure key flag in register SKF (e.g., to a logic 1) to return FPGA 1600 to the secure-key mode. Another embodiment eliminates register SKF, instead allowing address register Addr to be set to a secure-key address that does not correspond to any key address. Including register SKF avoids the need for a dummy key address and affords some protection against accidentally erasing an encryption key from memory 23.

Figure 17A:
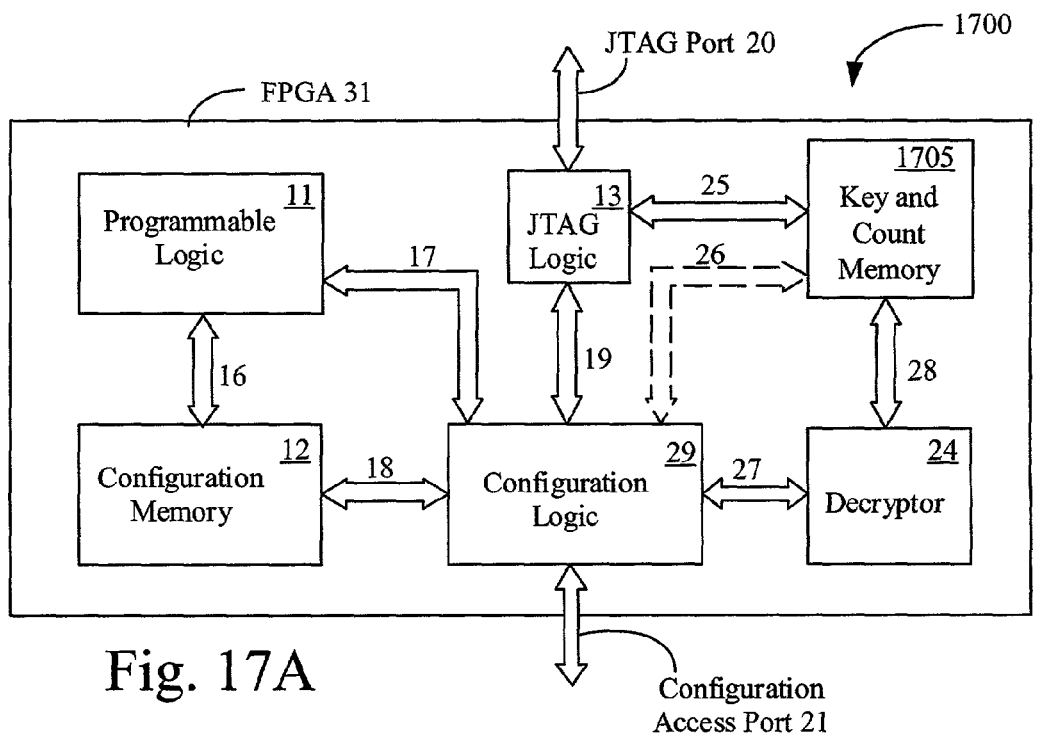
FIG. 17A depicts an FPGA 1700 in accordance with another embodiment that protects against Trojan Horse attacks.

FIG. 17A depicts an FPGA 1700 in accordance with another embodiment that protects against Trojan Horse attacks. Some elements are the same as shown in FIG. 1, are given the same reference numbers, and not explained again. In addition, FIG. 17A includes an expanded configuration logic unit 29, a decryptor 24, and a key and count memory 1705. FIG. 17A shows an embodiment in which memory 1705 is loaded with a sequence of encryption keys and associated counts via bus 25 from JTAG access port 20. In other embodiments, key memory 1705 is loaded through another port.

As with FIG. 3, bus 25 carries data, addresses, and control signals to perform write and read operations and allows programming of the decryption keys and associated counts from JTAG port 20. An optional bus 26 between configuration logic and memory 1705 allows programming of keys and counts via configuration access port 21. Bus 26 may also carry security data from memory 1705 to configuration logic 29. In one embodiment, bus 27 carries encrypted configuration data from configuration logic 29 to decryptor 24 and carries decrypted configuration data back to configuration logic 29. Bus 28 allows decryptor 24 to access the keys and counts for decrypting data. When the structure of FIG. 17A is being loaded with encrypted data, an attacker who monitors the bitstream as it is being loaded receives only the encrypted bitstream.

In some embodiments, the bitstream for a design or a subdesign comprises two or more portions, each of which may be encrypted using a different key. Prior to loading, the author of each portion calculates the byte count for his or her portion and loads the required decryption key and byte count into key and count memory 1705. The designs are then loaded together as a single bitstream; partial reconfiguration is not allowed.

FPGA 1700 decrypts the first portions using the first password. At the start of the partial bitstream, configuration logic 29 loads the count associated with the decryption key for the first portions into a decrementing counter. The counter then decrements for each byte decrypted, reaching a count of zero when the first portion is fully decrypted. Configuration logic 29 then selects the subsequent key address in key and count memory 1705 to obtain the decryption key and associated count for the next portion of the bitstream.

Figure 17B:
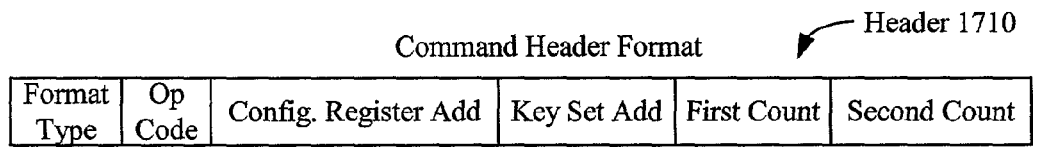
FIG. 17B depicts a command header format 1710 in accordance with an embodiment in which counts are conveyed to an FPGA as part of a command header.

In another embodiment, the count is not stored in memory 1705, but is instead passed to FPGA 1700 as part of the bitstream. For example, the count may be in the encrypted data, or may be determined by a specific data pattern (a word that decrypts to all zeros, for example). FIG. 17B depicts a command header format 1710 in accordance with an embodiment in which counts are conveyed to an FPGA as part of a command header. Header format 1710 is similar to header format 1 of FIG. 2b, but includes a count field for each separately encrypted portion of a configuration bitstream. The example of FIG. 17B assumes two separately encrypted portions having respective first and second word counts.

Figure 17C:
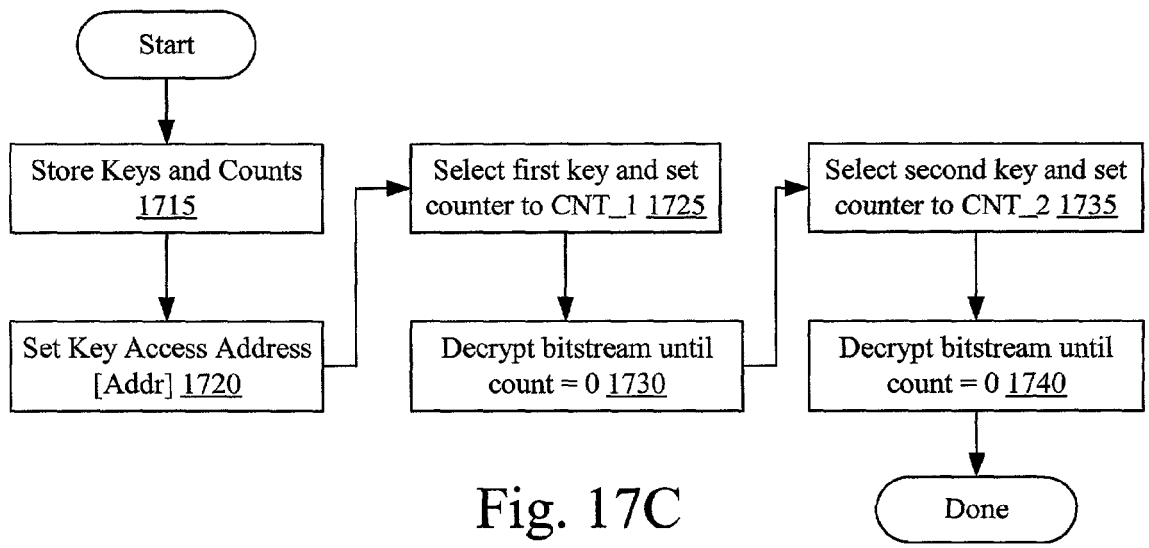
FIG. 17C is a flowchart depicting the operation of an embodiment of FPGA 1700 of FIG. 17A.

FIG. 17C is a flowchart depicting the operation of an embodiment of FPGA 1700 of FIG. 17A. Beginning at step 1715, the authors of the different subdesigns in a given configuration store their respective decryption keys in memory 1705. The authors also count the respective byte lengths of their designs and store the resulting values, or "counts." In one embodiment, the counts are stored in memory 1705. The encrypted subdesigns are then combined to form a signal configuration bitstream.

The configuration bitstream includes a header specifying the address in memory 1705 corresponding to the first key/count pair. In step 1725, configuration logic 29 retrieves the decryption key and the associated count (e.g., "CNT_1"). Configuration logic 29 then employs the key to decrypt the number of bytes specified by the count (step 1730). In one embodiment, configuration logic 29 includes a counter that counts down from CNT_1 to zero. When finished with the first portion of the bitstream, configuration logic 29 retrieves the next decryption key in memory 1705 and the associated count CNT_2 (step 1735). (In another embodiment, each key is separately addressed by the bitstream.) Configuration logic 29 then decrypts the number of bytes specified by CNT_2 (step 1740).

The embodiments of FIGS. 17A–17C prevent overwriting frames, and also prevent an attacker from substituting a subdesign that might compromise the security of other subdesigns.

The above description of the drawings gives detail on a few embodiments. However, many additional embodiments are also possible. By way of example:

1. many variations of encryption, decryption, and MAC algorithms that can be used;
2. data may be arranged in myriad formats;
3. the logic used to perform the various functions described herein can take different forms, may have more of fewer data transmission lines, and may include a variety of sources of information and ports that access configuration and non-volatile memory;
4. some instructions provided in the bitstream (e.g., CRC, InitCBC, address, and length) can be eliminated by instead relying on standard positions within the bitstream;
5. the particular process flows described above can be ordered differently;
6. the information of which frames have been written may be stored in other ways, e.g., as a range of frame addresses; and
7. the non-volatile memory can be implemented in a variety of forms.

These and other variations that have become obvious from the above description are intended to be included in the scope of the invention.

What is claimed is:

1. A programmable logic device comprising:

configuration memory;

programmable logic circuitry coupled to the configuration memory;

programmable routing circuitry coupled to the configuration memory and configured to inter-couple the programmable logic circuitry;

a key memory having a plurality of key fields and respectively associated read-protect fields, wherein each key field is adapted to store a decryption key, and wherein each read-protect field is adapted to store a first read-protect value disabling reads from the key field and a second read-protect value enabling reads from the associated key field; and a configuration circuit arrangement coupled to the configuration memory and to the key memory, the configuration circuit arrangement adapted to decrypt input configuration data using the decryption keys and write decrypted configuration data to the configuration memory.

2. The programmable logic device of claim 1, wherein:

the key memory is adapted to store at least one password; and the configuration circuit is further adapted to decrypt an encrypted input password accompanying the encrypted input configuration data, and the configuration logic circuit is further adapted to abort configuration of the programmable logic device responsive to a decrypted input password and the at least one password from the key memory being not equal.

3. A method of validating and securing encryption keys for configuring a programmable logic device, the method comprising:

writing a plurality of encryption keys to respective key fields in the programmable logic device to create stored versions of the keys in the programmable logic device;

automatically resetting each of a plurality of read-protect fields to a first value in response to the writing of the plurality of encryption keys, wherein each read-protect field is respectively associated with a key field, and the first value in a read-protect field enables user readback from the associated key field;

reading back the stored versions of the keys from the programmable logic device;

comparing the stored versions of the keys with the encryption keys;

in response to a match of the stored versions of the keys and the encryption keys, setting each of the read-protect fields to a second value that disables user readback from the associated key field, and disabling user readback of the stored versions of the keys while allowing use of the keys for decryption in response to a match of the stored versions of the keys and the encryption keys;

decrypting input configuration data using the stored versions of the keys; and writing decrypted configuration data to configuration memory of the programmable logic device.

4. The method of claim 3, wherein disabling user readback of a stored version of a first key does not bar user readback of a stored version of a second key.

5. The method of claim 3, further comprising:

storing a first password in the key memory;

inputting an encrypted password accompanying the encrypted configuration data;

decrypting the encrypted password into a second password using the decryption key; and aborting configuration of the PLD responsive to the second password and the first password being not equal.

* * * * *